(12) United States Patent
Boesch et al.

(10) Patent No.: US 12,540,029 B2
(45) Date of Patent: Feb. 3, 2026

(54) REPLACEMENT BOTTOM FOR CONTAINER

(71) Applicant: TBI Engineering and Design, LLC, Otsego, MN (US)

(72) Inventors: Timothy Boesch, Otsego, MN (US); Travis Boesch, Burnsville, MN (US)

(73) Assignee: TBI ENGINEERING AND DESIGN, LLC, Otsego, MN (US)

( * ) Notice: Subject to any disclaimer, the term of this patent is extended or adjusted under 35 U.S.C. 154(b) by 0 days.

(21) Appl. No.: 18/516,621

(22) Filed: Nov. 21, 2023

(65) Prior Publication Data

US 2024/0092564 A1 Mar. 21, 2024

Related U.S. Application Data

(62) Division of application No. 17/359,995, filed on Jun. 28, 2021, now Pat. No. 11,858,726.

(60) Provisional application No. 62/706,214, filed on Aug. 5, 2020.

(51) Int. Cl.
| B65D 90/02 | (2019.01) |
| B65D 88/02 | (2006.01) |
| B65D 90/18 | (2006.01) |
| B65F 1/12 | (2006.01) |
| B65F 1/14 | (2006.01) |

(52) U.S. Cl.
CPC ............ *B65D 90/02* (2013.01); *B65D 88/02* (2013.01); *B65D 90/18* (2013.01); *B65F 1/12* (2013.01); *B65F 1/1473* (2013.01)

(58) Field of Classification Search
CPC .. B65D 90/023; B65D 88/005; B65D 81/361; B65D 21/083; B65D 21/08; B65D 90/02; B65D 88/02; B65D 90/18; B65F 1/12; B65F 1/1473; B65F 1/122; B65F 2230/148
See application file for complete search history.

(56) References Cited

U.S. PATENT DOCUMENTS

| 3,858,806 | A | | 1/1975 | Miller et al. |
| 5,375,860 | A | | 12/1994 | Ernsberger et al. |
| 5,542,206 | A | | 8/1996 | Lisch |
| 5,617,679 | A | * | 4/1997 | Meyers ................... E02D 29/12 |
| | | | | 405/136 |
| 5,671,856 | A | * | 9/1997 | Lisch .................. B65D 21/0228 |
| | | | | 220/4.27 |
| 5,678,716 | A | | 10/1997 | Umiker |
| 5,901,872 | A | | 5/1999 | Zollinhofer et al. |
| 6,003,706 | A | * | 12/1999 | Rosen .................. B65D 21/083 |
| | | | | 220/4.26 |
| 6,116,439 | A | * | 9/2000 | Yaniv ..................... B65D 11/04 |
| | | | | 215/11.1 |
| 7,021,480 | B2 | | 4/2006 | Yu |
| 7,510,096 | B2 | | 3/2009 | Wang |
| 7,569,770 | B2 | | 8/2009 | Remmert et al. |

(Continued)

OTHER PUBLICATIONS

Application and File History for U.S. Appl. No. 17/359,995, filed Jun. 28, 2021, inventors Boesch et al.

*Primary Examiner* — Kareen K Thomas
(74) *Attorney, Agent, or Firm* — Husch Blackwell LLC

(57) ABSTRACT

A container and methods for construction are disclosed herein for a container having a replaceable bottom pan. An adapter is affixed to the lower edge the container and a replaceable bottom pan is removably affixed to the adapter.

17 Claims, 34 Drawing Sheets

(56) References Cited

U.S. PATENT DOCUMENTS

| | | | |
|---|---|---|---|
| 8,342,346 B2* | 1/2013 | Rances | B65D 25/04 |
| | | | 220/529 |
| 8,474,622 B2 | 7/2013 | Carver et al. | |
| 9,492,024 B2 | 11/2016 | Sorenson et al. | |
| 9,850,064 B2 | 12/2017 | Egan et al. | |
| 10,647,469 B2 | 5/2020 | Steiger | |
| 2004/0089657 A1 | 5/2004 | Waszak | |
| 2006/0266747 A1* | 11/2006 | Stolzman | B65D 19/18 |
| | | | 220/4.26 |
| 2010/0065557 A1 | 3/2010 | Gersovitz | |
| 2010/0096389 A1 | 4/2010 | Volpe et al. | |
| 2010/0200438 A1* | 8/2010 | Davies | B65D 81/3205 |
| | | | 220/4.27 |
| 2011/0109073 A1 | 5/2011 | Williams | |
| 2011/0155610 A1* | 6/2011 | Carver, III | B65D 19/0018 |
| | | | 220/656 |
| 2013/0270264 A1 | 10/2013 | Suljak | |
| 2014/0083879 A1* | 3/2014 | Ulstad | B65D 51/225 |
| | | | 215/11.1 |
| 2014/0190987 A1* | 7/2014 | Brundick | A47F 1/08 |
| | | | 222/566 |
| 2015/0053676 A1 | 2/2015 | Sand | |
| 2022/0135283 A1 | 5/2022 | Balaban et al. | |

* cited by examiner

REPLACEMENT BOTTOM FOR CONTAINER

CROSS-REFERENCE TO RELATED APPLICATIONS

This application is a divisional of U.S. application Ser. No. 17/359,995, filed Jun. 28, 2021, which claims the benefit of Provisional Application No. 62/706,214, filed Aug. 5, 2020, titled "REPLACEMENT BOTTOM FOR CONTAINER," the disclosures of which are hereby incorporated by reference in their entireties.

TECHNICAL FIELD

The present disclosure relates generally to containers. More specifically, the present disclosure relates to a replaceable bottom pan for dumpsters for use in the waste, construction or manufacturing industries.

BACKGROUND

Industrial trash containers, such as dumpsters, have conventionally been made of steel and assembled at the manufacturing facility using welded joints. Welded joints of dumpsters have some advantages over other construction techniques, such as consistently providing waterproof joints. Once the steel dumpsters are welded, they are then shipped, mostly or fully assembled, to wholesalers or end users.

The cost of producing and selling dumpsters in this way is high, however. One contributing source of the high costs is due to skilled labor and complex fixturing being required for welding joints. Another source of high manufacturing cost is shipping. Because the dumpsters are mostly or fully assembled, the dumpsters have low relative shipping density making the expense of shipping the steel dumpsters considerable. The prohibitive costs involved in shipping mostly or fully assembled steel dumpsters have resulted in geographically restricted customer bases for dumpster manufacturers. For this reason, there are a larger number of dumpster manufacturers, which results in a smaller average production output volume at each facility and unnecessary variations in dumpster design and sizing. Thus, dumpster manufacturers are unable to take full advantage of economies of scale. Further, the high shipping costs also tend to preclude dumpster manufacturers from repair business opportunities.

Further, welded steel construction imposes material constraints that are not easily rectified. Because many dumpsters are used to collect wet and corrosive materials and are subject to harsh environments, steel dumpsters tend to be susceptible to rust and other corrosion, commonly of the bottom portion of the dumpster. When welded steel dumpsters are damaged to the point of allowing seepage of liquid therethrough, costly repair or full replacement is required such as to comply with environmental regulations or other ordinances. Due to the large variations in dumpster design and sizing, a universal replacement bottom which fits dumpsters from many manufacturers has previously not been possible.

Welded steel assembly also limits the use of galvanized steel as galvanized steel is difficult to weld without creating high porosity weld joints. An improvement in the industry is to produce dumpsters out of plastic. However, plastic dumpsters can be costly due to the added material required to meet material strength requirements which may still be insufficient for some uses.

The present disclosure addresses these concerns.

SUMMARY

In embodiments, a container and methods for construction are disclosed herein for a container having a replaceable bottom pan. An adapter can be affixed to a lower edge of a wall structure of the container, and protrudes outward from an exterior surface of the wall structure. A replaceable bottom pan can be removably affixed to the adapter.

In an embodiment, the disclosure is directed to a system for attachment to an open bottom of a container having a plurality of container sidewalls. The system comprises an adapter including a major flange having a container-abutting face, and a minor flange having a pan-abutting face, wherein the major flange is offset from the minor flange and further wherein the container-abutting face is generally parallel to the pan-abutting face, and a pan, configured to be releasably coupleable to the adapter, the pan including a plurality of pan sidewalls connected between a generally planar bottom portion and an attachment flange. The adapter is configured to be connected to the container such that the container-abutting face of the major flange is generally orthogonal to the plurality of container sidewalls, and the attachment flange of the pan is releasably coupleable to the pan-abutting face of the adapter.

In an embodiment, the disclosure is directed to a method of repairing a container, the container including a plurality of container sidewalls and an existing bottom portion. The method comprises removing the existing bottom portion of the container so as to create an open lower end of the container, attaching an adapter to the container, the adapter including a major flange having a container-abutting face, and a minor flange having a pan-abutting face, wherein attaching the adapter to the container comprises positioning the adapter at the open lower end of the container such that the container-abutting face of the adapter is in contact with ends of the container sidewalls, the adapter configured to be attached to the container such that the container-abutting face of the major flange is generally orthogonal to the plurality of container sidewalls, and coupling a pan to the adapter, the pan including a plurality of pan sidewalls connected between a generally planar bottom portion and an attachment flange, wherein coupling a pan to the adapter comprises coupling the attachment flange of the pan to the pan-abutting face of the adapter.

In an embodiment, the disclosure is directed to a method, comprising providing an adapter to a user, the adapter including a major flange having a container-abutting face, and a minor flange having a pan-abutting face, wherein the major flange is offset from the minor flange and further wherein the container-abutting face is generally parallel to the pan-abutting face, providing a pan to the user, the pan including a plurality of pan sidewalls connected between a generally planar bottom portion and an attachment flange, and providing instructions recorded on a tangible medium to the user, the instructions for repairing a container, the container including a plurality of container sidewalls and an existing bottom portion. The instructions comprise removing the existing bottom portion of the container so as to create an open lower end of the container, attaching the adapter to the container, by positioning the adapter at the open lower end of the container such that the container-abutting face of the adapter is in contact with ends of the container sidewalls, the adapter configured to be attached to the container such that the container-abutting face of the major flange is generally orthogonal to the plurality of container sidewalls, and coupling the pan to the adapter, by coupling the attachment flange of the pan to the pan-abutting face of the adapter.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1A:
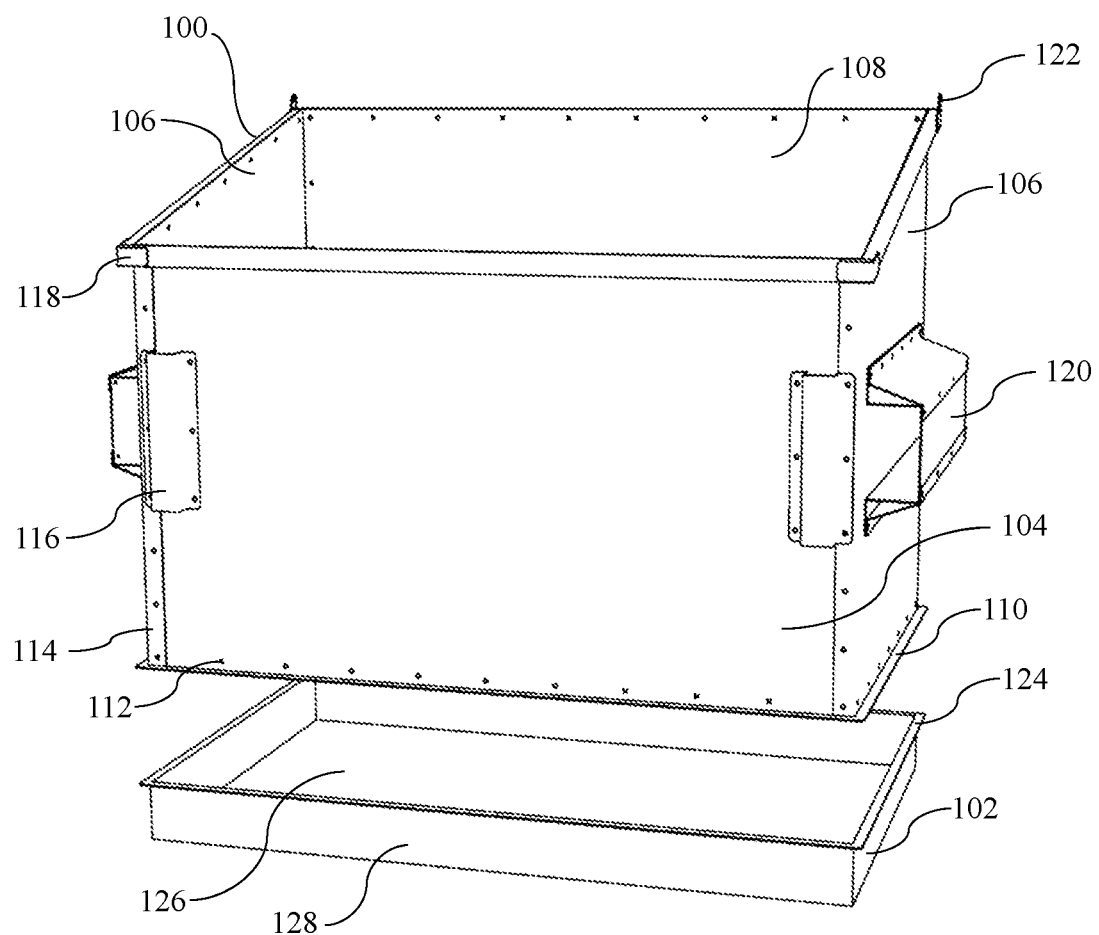
FIG. 1A is an exploded view of a container with a replaceable bottom pan according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments of the present disclosure pertain to replaceable components, such as bottoms, for containers. Embodiments of the present disclosure may be suitable for containers used to store refuse or recyclables, particularly in construction and commercial industries.

Figure 1B:
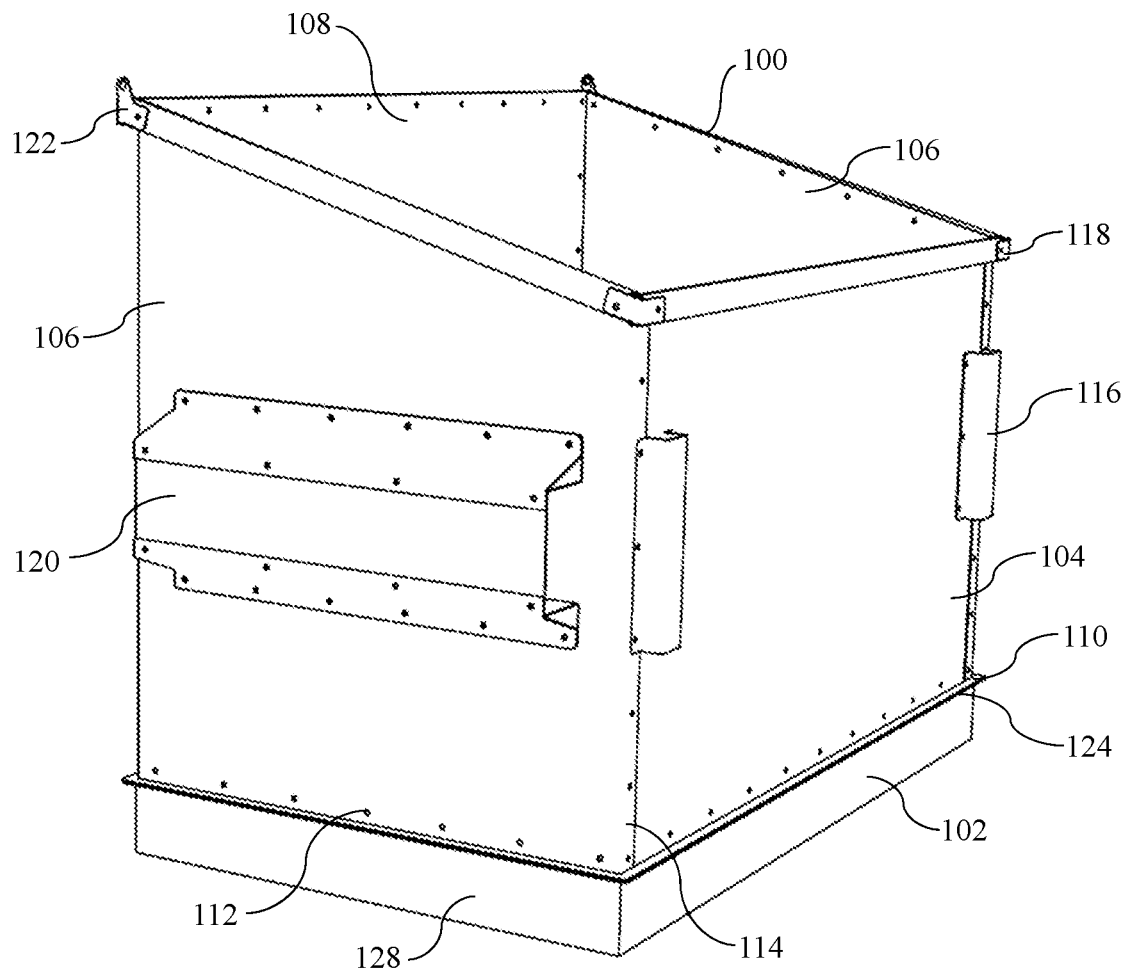
FIG. 1B is a perspective assembled view of FIG. 1A.
Figure 1C:
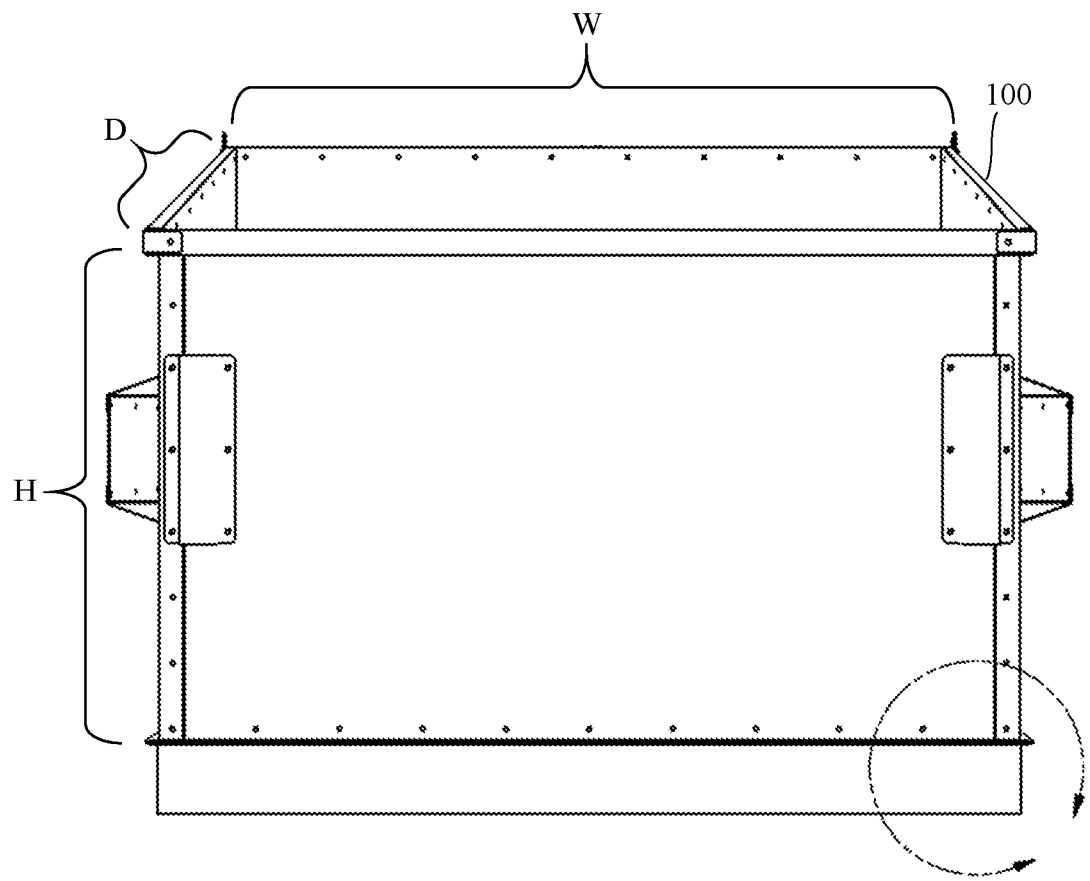
FIG. 1C is a front assembled view of FIG. 1A.
Figure 1D:
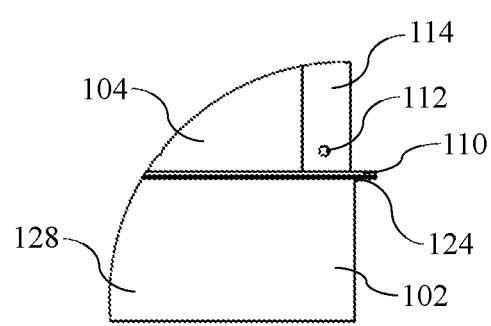
FIG. 1D is a close-up front assembled view of FIG. 1A.

FIGS. 1A-1C depict an exemplary embodiment of a modular container 100 with a bottom pan 102. Container 100 generally comprises front wall 104, sidewalls 106, back wall 108, and bottom edge 110. The components of container 100 may be assembled and coupled together using various fixation methods such as nut and bolt, rivet, bolt and threaded aperture, or other suitable fixation hardware, such as through container wall apertures 112. Front wall 104 and back wall 108 are coupled to opposite ends of sidewalls 106 so as to define an interior space. Bottom edge 110 can extend along the bottom perimeter of front wall 104, sidewalls 106, and back wall 108 extending outward. In embodiments, front edge 114 of sidewalls 106 can be bent parallel to front wall 104 to provide additional reinforcement and a more secure connection. In embodiments, the components of container 100 can be formed integrally or otherwise affixed without fasteners, such as by welding.

Referring to FIG. 1C, in embodiments front wall 104 and back wall 108 have about the same width, as indicated by W, but vary in height, as indicated by H. In such an embodiment, variance in height is gradually reduced along the depth, as indicated by D, of container 100, such that front edge 114 of sidewalls 106 has a height about equal to the height of front wall 104 and a back edge of sidewalls 106 has a height about equal to the height of back wall 108.

With continued reference to FIGS. 1A-1C, container 100 can comprise features to strengthen structural integrity and provide utility. In embodiments, these features can comprise front guards 116, corner reinforcements 118, lift receivers 120, and lid hinges 122. Front guards 116 and corner reinforcements 120 can provide additional securement of sidewalls 106 to front wall 104. Lift receivers 118 can be coupled to sidewalls 106 and are configured to receive prongs of a dump truck or other machinery in order to empty the contents of container 100 by lifting container 100 at least partially upside down. Lid hinges 122 are configured to couple a container lid (not shown).

Container 100 can be a modular, bolt-together embodiment designed to be shipped in parts and built remotely. Such as modular design can dramatically reduce shipping costs.

In embodiments, bottom pan 102 can comprise pan base 126, pan sidewalls 128, and flange 124. Pan sidewalls 128 extend orthogonally around the perimeter of pan base 126 such that bottom pan 102 is capable of holding liquid without leakage. Flange 124 protrudes outwardly from the end of pan sidewalls 128 and is configured to be coupled to container 100 along bottom edge 110. In some embodiments, a plurality of flange apertures can be spaced along the length of flange 124. The plurality of flange apertures can be positioned to align with corresponding bottom edge apertures (not shown) in bottom edge 110 such as with bolts or other suitable fasteners.

In embodiments, bottom edge 110 can improve the ease of attachment or replacement of bottom pan 102 by providing a wider attachment surface with which to align flange 124. Differences in the dimensions of sidewalls 128 of bottom pan 102 and the interior perimeter of container 100 can be addressed by the sizing of flange 124 and bottom edge 110. For example, flange 124 can be manufactured to extend to the width of the largest containers and then be cut to the dimensions of smaller containers if necessary. Additionally, bottom edge 110 reduces the need to access the interior, refuse-containing portion of the container when coupling bottom pan 102 to container 100.

In embodiments, bottom pan 102, front wall 104, sidewalls 106, and back wall 108 may comprise mild steel construction. In alternative embodiments, bottom pan 102, front wall 104, sidewalls 106, and back wall 108 can comprise galvanized steel, aluminum, various plastic, or other suitable materials. In yet other embodiments, bottom pan 102, front wall 104, sidewalls 106, and back wall 108 can comprise varied materials. For example, bottom pan 102 can comprise galvanized steel, stainless steel, plastic (e.g., polyethylene), aluminum or other suitable materials, while front wall 104, sidewalls 106, and back wall 108 can comprise plain rolled steel. For example, pre-coated galvanized sheeting with a minimum of G90 thickness can be cut or punched to create bottom pan 102, front wall 104, sidewalls 106, and back wall 108 via computer numerically controlled (CNC) fabrication equipment such as, but not limited to the following: sheet metal laser, Turret Punch, Water jet, and/or press brake. Fastening apertures disclosed herein can be created using drill or drill press, plasma cutter, water jet, or any other suitable method known to persons skilled in the art. Suitable manufacturing processes for plastic embodiments of bottom pan can include thermoforming, rotomolding or injection molding.

Container 100 and bottom pan 102 represent an improvement over conventional solutions to replacing the corroded bottom surfaces of containers that require substantial rearrangement of the container while manually welding a new sheet of metal to the base of the container. This manual process requires the welder to enter the interior of the container for prolonged periods to weld along the inside of the container. Container 100 and bottom pan 102 can be coupled with significantly less effort than conventional approaches as bottom edge 110 and flange 124 are exterior to container 100 and easily accessed around the perimeter. Further, container 100 and bottom pan 102 can be coupled by fasteners allowing for more flexibility depending on the status of container 100 and the resources available to workers.

Figure 2A:
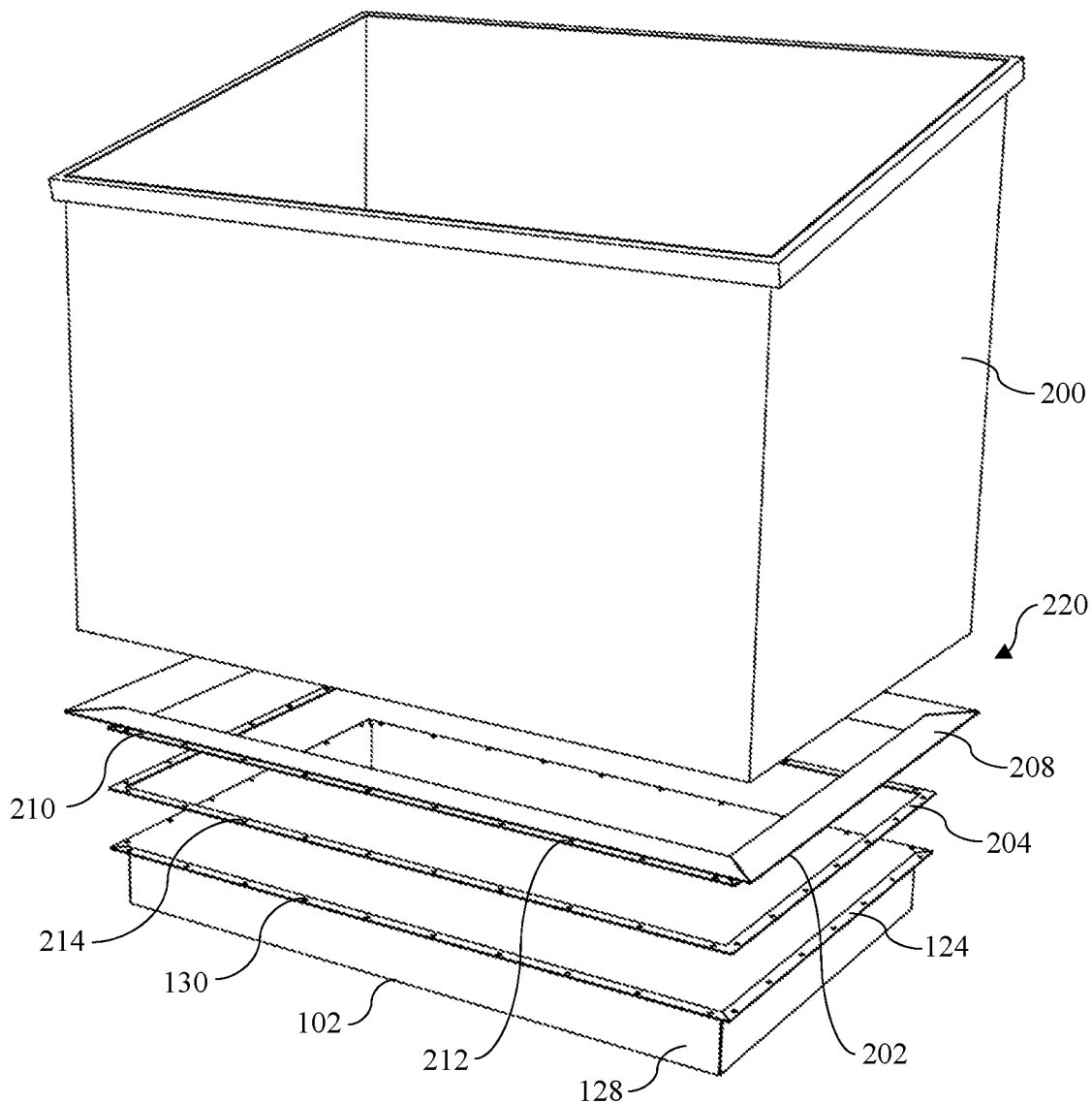
FIG. 2A is an exploded view of a container with a lip adapter and replaceable bottom pan according to an embodiment.
Figure 2B:
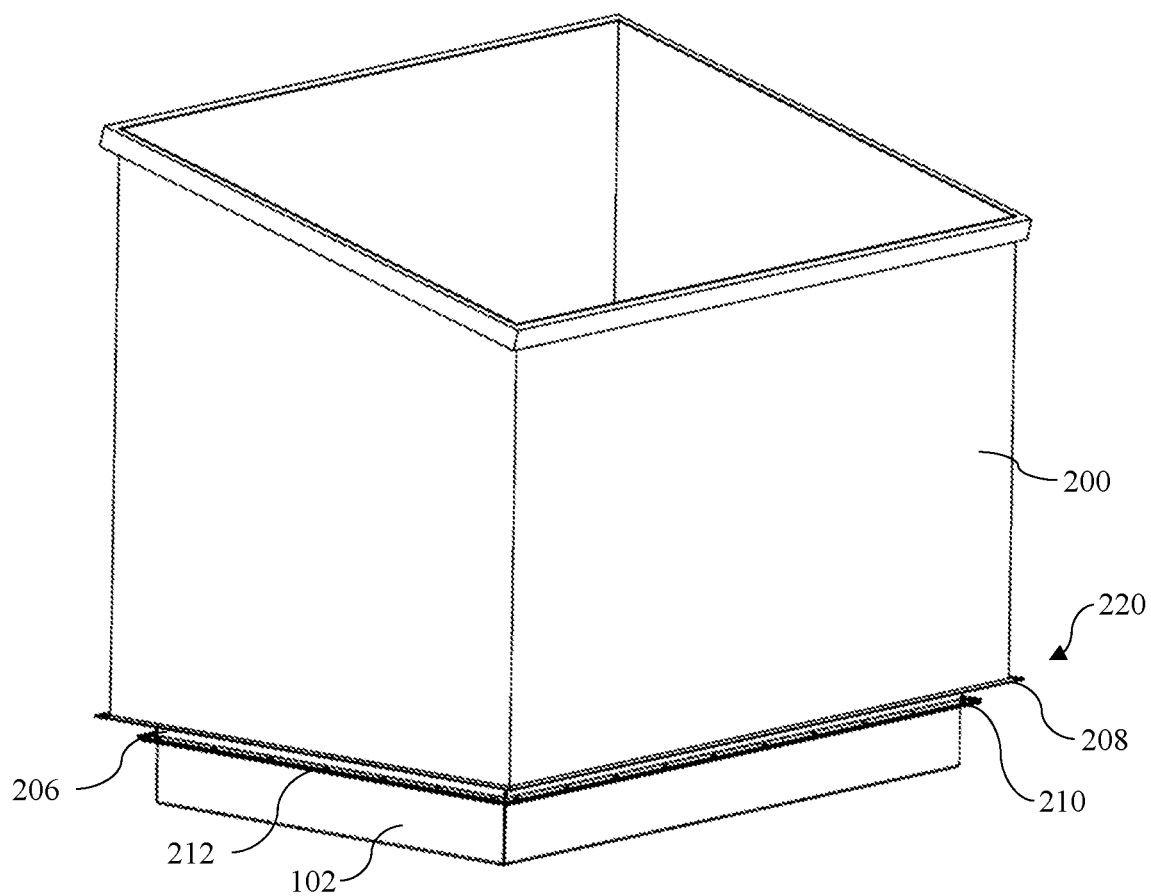
FIG. 2B is a perspective assembled view of FIG. 2A.
Figure 2C:
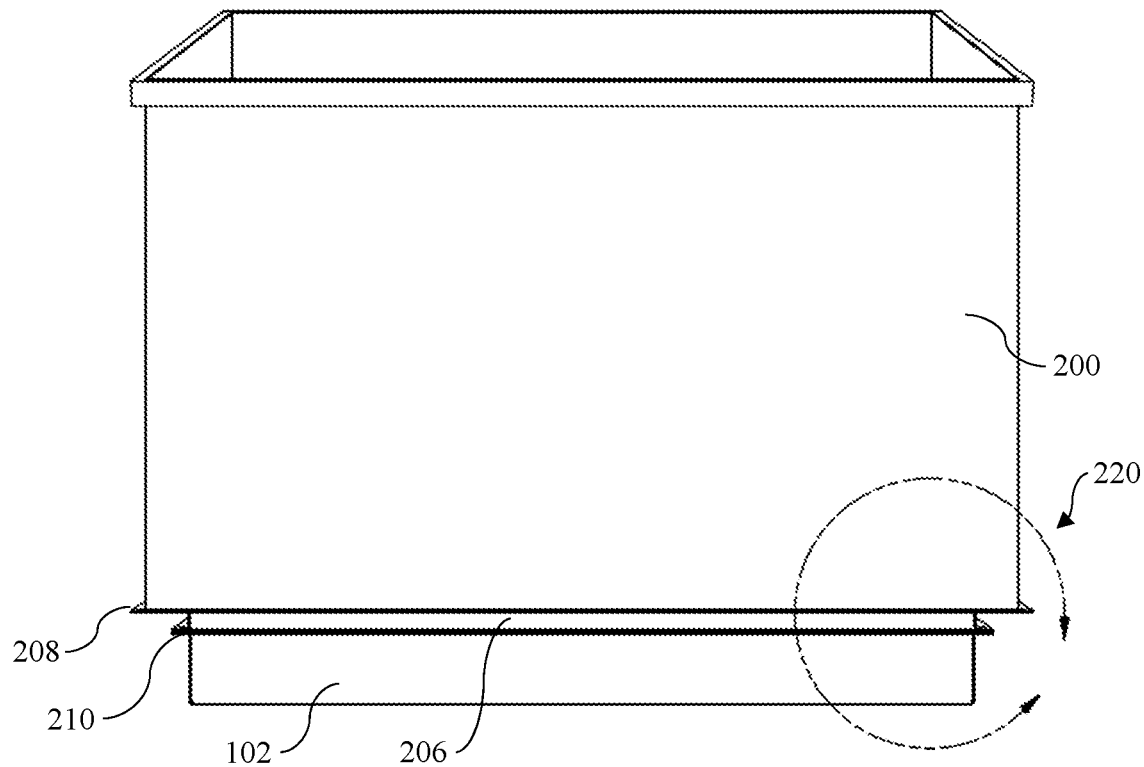
FIG. 2C is a front assembled view of FIG. 2A.
Figure 2D:
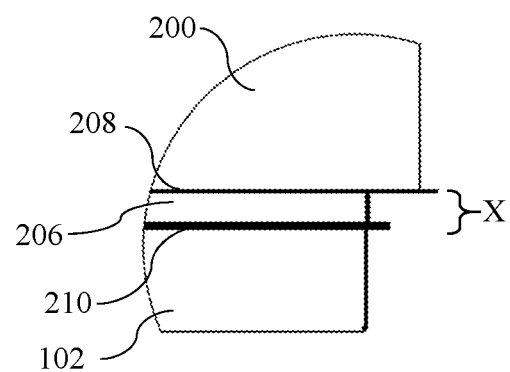
FIG. 2D is a close-up front assembled view of FIG. 2A.

Referring now to FIGS. 2A-2C, an embodiment of bottom pan adapter system 220 for attaching bottom pan 102 to container 200 is depicted. Container 200 represents a conventional waste container or dumpster with the original bottom removed. Bottom pan adapter system 220 includes replacement bottom pan 102, lip adapter 202, and optionally gasket 204. In embodiments, bottom pan 102 comprises flange 124 including flange apertures 130. Lip adapter 202 can comprise spacer 206, top adapter lip 208, and bottom adapter lip 210. Spacer 206 can define an interior and connect top adapter lip 208 and bottom adapter lip 210 which both protrude outward therefrom. Top adapter lip 208 provides a container-abutting face or surface for attachment to the base of container 200, such as bottom edge 110. In embodiments, top adapter lip 208 can be welded to the base of container 200. In embodiments, spacer 206 provides clearance for working on top adapter lip 208 during attachment to container 200. The clearance provided can be increased by increasing the height, indicated by X in FIG. 2C, of spacer 206. Bottom adapter lip 210 provides a pan-abutting face or surface for attachment to bottom pan 102. Bottom adapter lip 210 can include bottom adapter lip apertures 212 configured to align with corresponding flange apertures 130, allowing bottom adapter lip 210 to attach to flange 124 via bolts or other suitable fasteners. Bottom pan 102 can be connected to, or removed from, bottom adapter lip 208 entirely from the outside of the container; that is, without accessing the interior, refuse-containing portion of the container. In embodiments, one lip adapter 202 can be reused to couple the container to multiple replacement bottom pans 102 over time.

When used, gasket 204 can seal the coupling between flange 124 and bottom adapter lip 210. In some embodiments, gasket 204 can include gasket apertures 214 configured to align between flange apertures 130 and bottom adapter lip apertures 212. Gasket 204 can comprise material such as synthetic or natural elastic material, silicone, aluminum crush gasket, or other suitable gasket material. Gasket 204 is configured to aid in providing coupled edges that are liquid resistant or liquid tight. In embodiments, one or more of bottom pan 102 or flange 124 can include a channel or other suitable structure to receive gasket 204.

In embodiments, container 200 can be a container formed from a conventional welded-steel container with a bottom surface of the welded container removed and bottom pan 102 replacing the bottom surface. The bottom surface of such a container may be removed for various reasons such as having corrosion or other damage. In embodiments, the bottom surface of a single container can be repeatedly replaced by installing new bottom pans such as bottom pan 102.

Referring now to FIGS. 3A-3E, various views of lip adapter 202 are depicted. Use of lip adapter 202 enables manufacture of bottom pan 102 to be a standardized size, or one of several standardized sizes, while still allowing bottom pan 102 to fit to a wide range of sizes of containers. Using top adapter lip 208 to span containers of various dimensions allows for conversion of diverse preexisting containers. Furthermore, once a lip adapter has been coupled to a container, bottom pans can be interchanged without requiring a new lip adapter. Bottom pan 102 can be connected to, or removed from, bottom adapter lip 210 entirely from the outside of the container; that is, without accessing the interior, refuse-containing portion of the container.

Referring to FIGS. 2A-2C, it will be appreciated that the interior perimeter of container 200 is greater than the perimeter of pan sidewalls 128. In other embodiments, the inner perimeter of container 200 may be less than or approximately the same as the perimeter of pan sidewalls 128.

Thus, the ease of installation of lip adapter 202 and the reusability afforded by interchanging bottom pans can greater reduce upkeep costs associated with the gradual wear of containers. Once a container has been outfitted with a lip adapter, replacement of the bottom pan does not require any welding, dramatically simplifying the process and tools necessary. This simplification in maintenance means containers can be fixed at remote locations without having to be transported to a specific site.

In embodiments, top adapter lip 208 is generally sized larger (e.g., having a greater perimeter) than bottom adapter lip 210 such that when coupled to a container, the bolts or other fasteners coupling bottom pan 102 to bottom adapter lip 210 are situated inwardly from an outer perimeter of top adapter lip, thereby providing some protection from direct exposure to rain or other environmental conditions. In embodiments using bolts and nuts to fasten bottom pan 102 to lip adapter 202, lip adapter 202 is configured such that a longitudinal axis of such bolts will be oriented generally orthogonal to a bottom plane of pan 102. As is apparent from the exemplary embodiments depicted in FIGS. 3A-3E, an outer perimeter of top adapter lip 208 is generally greater than an outer perimeter of bottom adapter lip 210. With the flexibility in sizes of the lips of lip adapter, precise size matching between the container and the replacement bottom pan is not necessary. For example, dumpsters of a given capacity from different manufacturers do not necessarily have identical measurements. Therefore variations in the depth and/or width of dumpsters is not uncommon and lip adapter 202 has broad applicability.

Figure 3A:
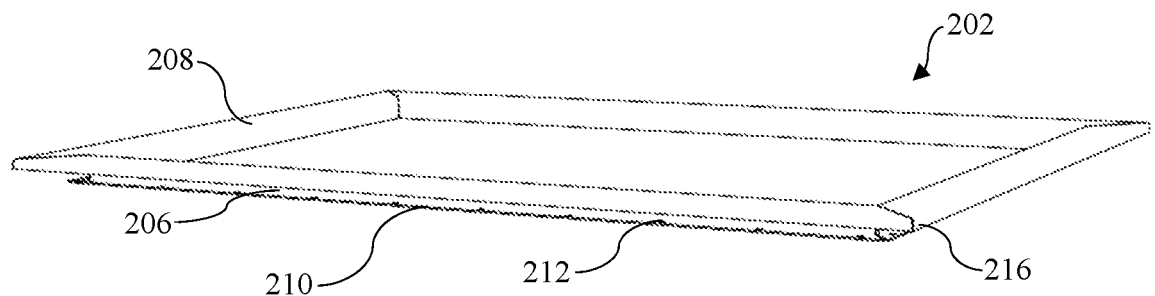
FIG. 3A is a perspective view of a lip adapter according to an embodiment.
Figure 3B:
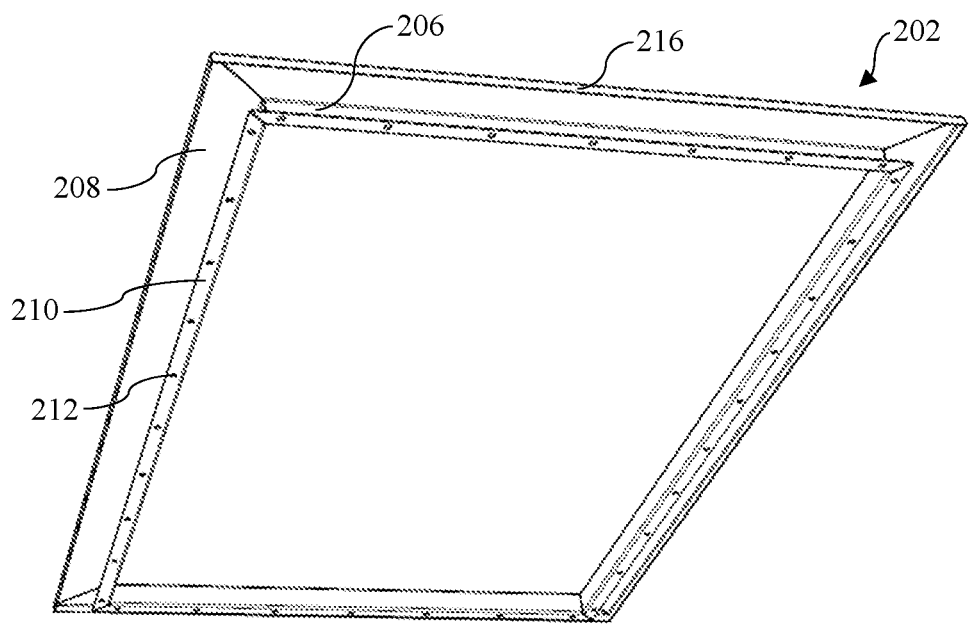
FIG. 3B is a perspective view of the lip adapter of FIG. 3A.
Figure 3C:
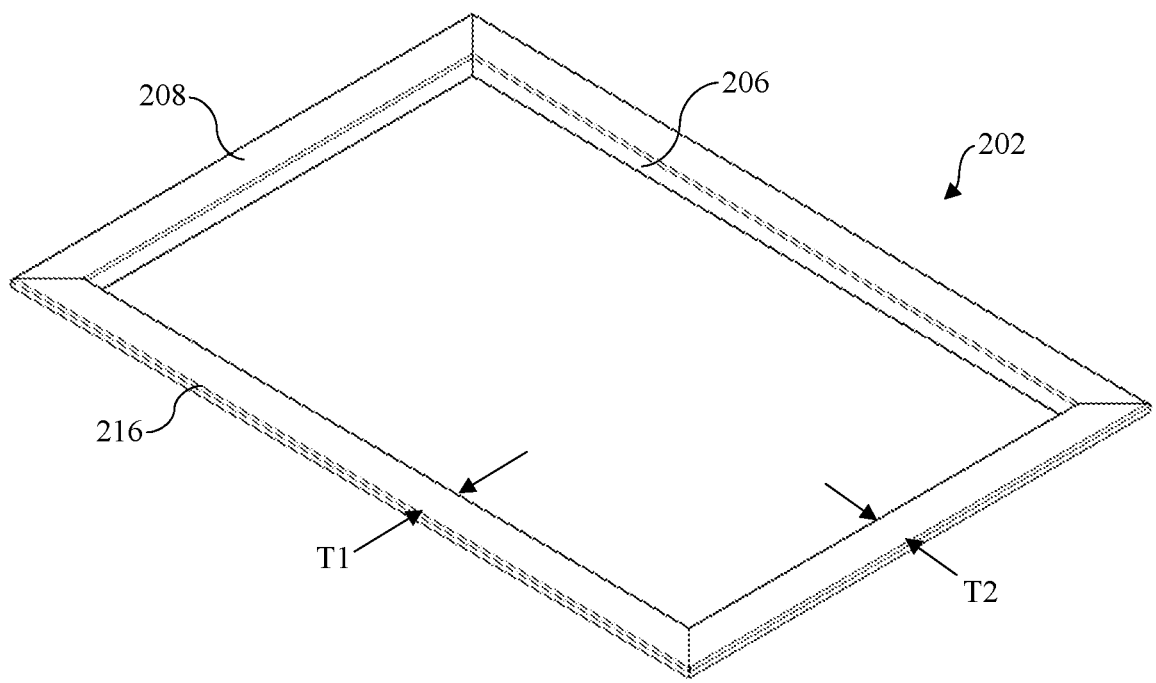
FIG. 3C is a perspective view of the lip adapter of FIG. 3A.
Figure 3D:
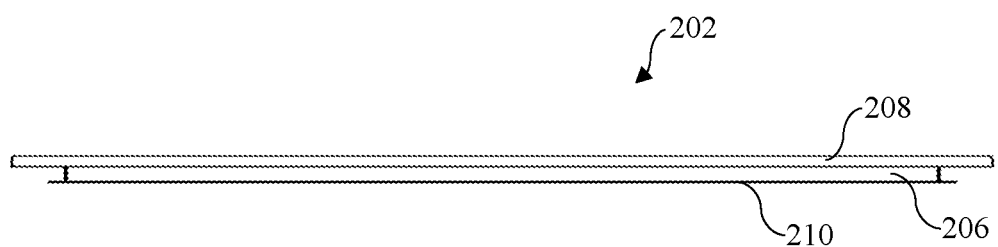
FIG. 3D is a side view of the lip adapter of FIG. 3A.
Figure 3E:
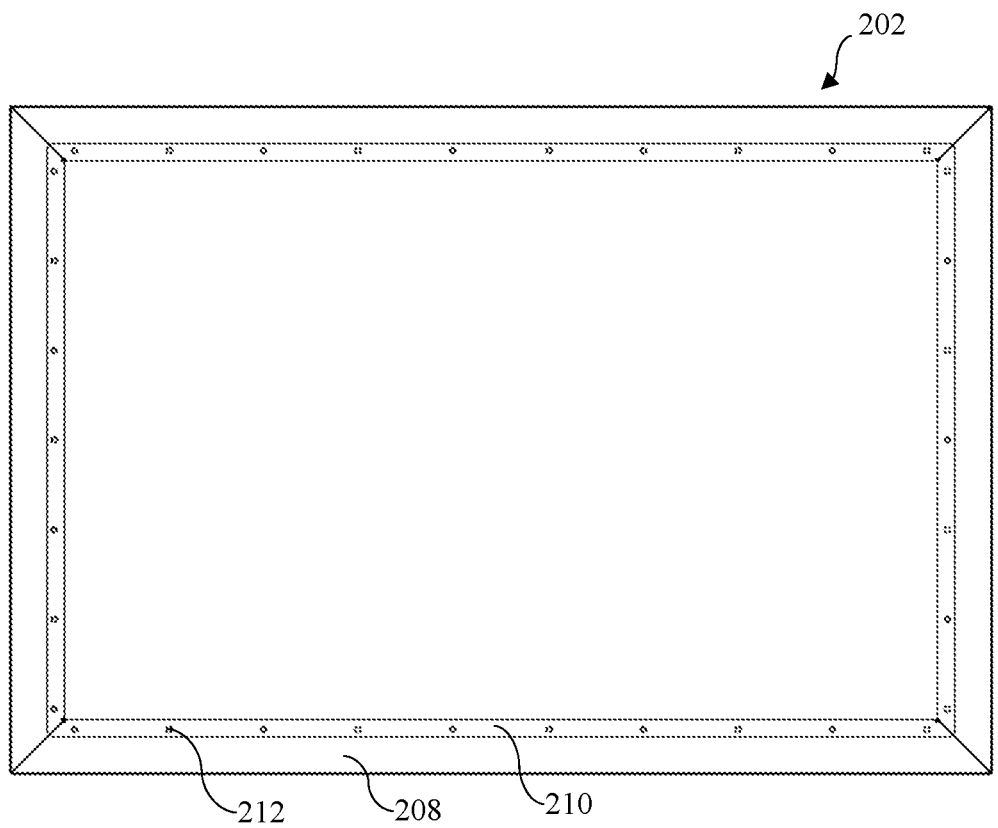
FIG. 3E is a bottom plan view of the lip adapter of FIG. 3A.

The dimensions of T1 and T2 on top adapter lip 208, as depicted in FIG. 3C, may be selected to provide adaptability to a variety of dumpster sizes. In embodiments, T1 and T2 may be similar, or identical, or different. Example size ranges for each of T1 and T2 may be from two to twelve inches. In another embodiment, the size ranges for each of T1 and T2 may be from two to eight inches. In another embodiment, the size ranges for each of T1 and T2 may be from four to six inches. For example, selecting a size of four inches for each of T1 and T2 would allow for adaptability to containers of varying sizes up to eight inches in each direction—depth and width.

In embodiments, lip adapter 208 can comprise rolled edge 216. Rolled edge 216 can strengthen top adapter lip 208 and reduce the risk of injury compared to a straight edge.

Lip adapter 202 can generally be constructed of mild steel. The material of lip adapter 202 can be selected to accommodate the welding of lip adapter 202 to container 200. In embodiments that do not require welding, lip adapter 202 can be made of plastic or other nonmetal materials.

Bottom pan adapter system 220 allows for conversion of diverse sizes of preexisting containers with bottom pans of standardized sizes. During installation, workers have greater access to the coupling between the top adapter lip and the container and to the bottom adapter lip and the bottom pan. This access directly contributes to easier, more efficient installation than conventional solutions to replacing bottom surfaces of containers.

Figure 3F:
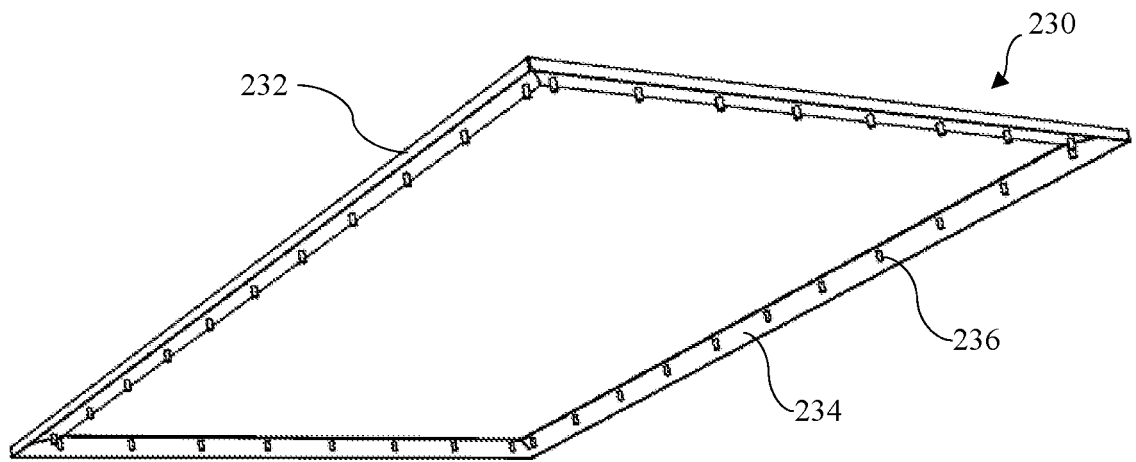
FIG. 3F is a bottom perspective view of an adapter according to an embodiment.

Referring to FIG. 3F, single lip adapter 230 is depicted according to an embodiment. Single lip adapter 230 generally comprises top surface 232 and bottom surface 234. In embodiments, bottom surface 234 comprises studs 236. In embodiments, studs 236 can be integral or welded to bottom surface 234. Various bottom pans of the present disclosure can then be attached to adapter 230 via studs 236 and corresponding nuts. In embodiments, top surface 232 can be welded to a base of a container, such as container 200. In embodiments, single lip adapter 230 is substantially similar to top adapter lip 208 of lip adapter 202 except for the addition of studs 236.

Figure 4:
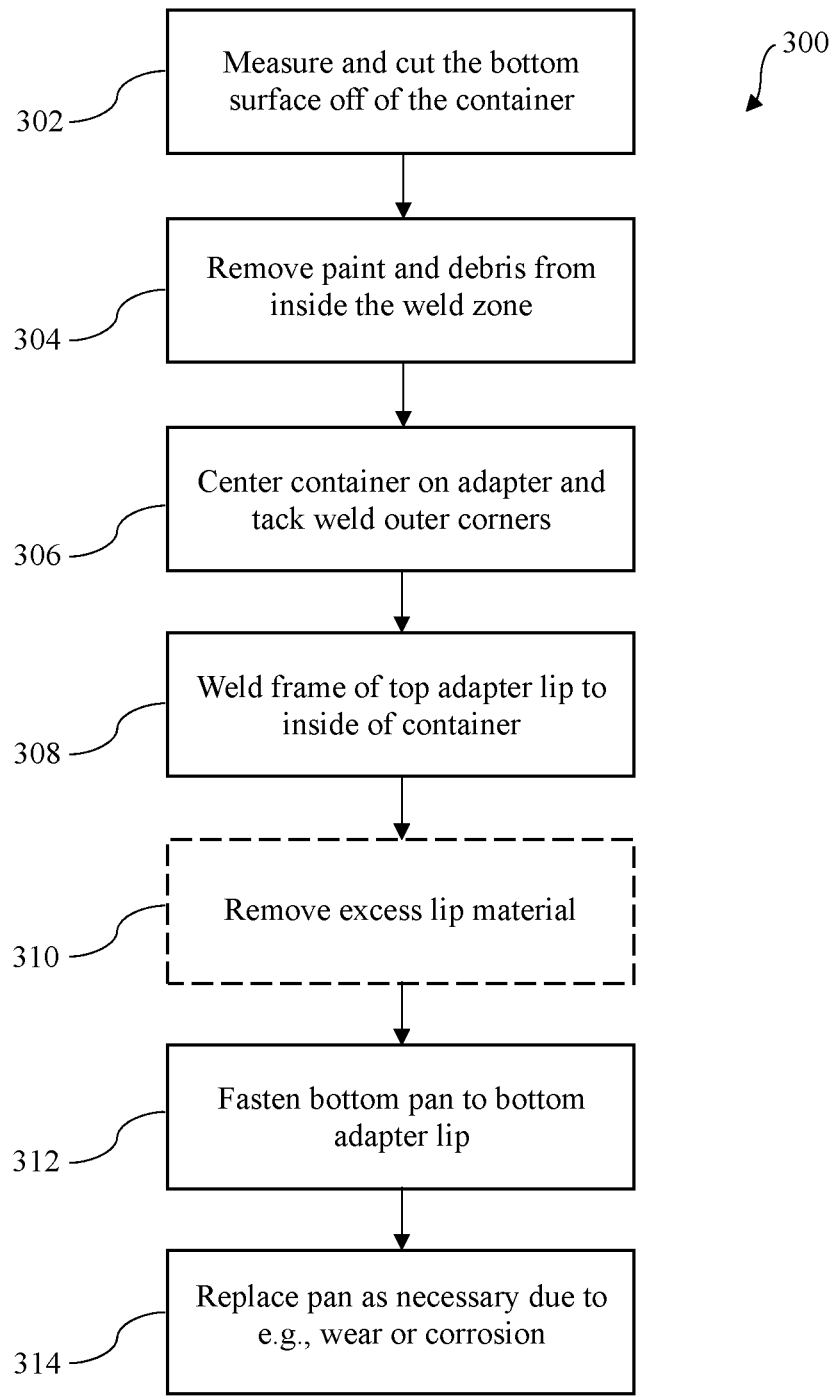
FIG. 4 is a flowchart of a method for reconstructing a container with a replaceable bottom pan according to an embodiment.

A method 300 for installing a replaceable bottom pan 102 is depicted in the flowchart of FIG. 4, according to embodiments of the present disclosure. If a conventional container, such as container 200, is to be converted to accommodate the lip adapter and replaceable bottom pan, the container should be measured and cut (302). In embodiments, the amount of material cut from the container can vary depending on severity of the corrosion. In one embodiment, the cut is made a few inches from the bottom of the container. In general, six inches can provide a guideline for how much of the bottom of the container should be removed to accommodate the lip adapter and the replaceable bottom pan, but the measurement may be adjusted according to the dimensions of the container being modified and desired characteristics of the newly assembled container.

To prepare the container for the welding of top adaptor lip 210, paint and debris are removed from inside the weld zone (304). The container is then centered on the top adapter lip and the two are tack welded together at the outer corners (306). The top adapter lip is then welded to the container (308) such as around the outside of the container. Optionally, any excess top adapter lip material, protruding farther out from the container than desired for attachment of the bottom pan, may be removed (310) such as with a cut-off wheel or torch or other suitable means. The bottom pan is then fastened to the container (312), such as via fasteners through aligned apertures in the bottom adapter lip and the bottom pan. A bottom pan gasket may also be installed to improve the seal and reduce the wear on the lip adapter and the bottom pan. As the bottom pan wears out or as otherwise desired, the bottom pan may be removed and a new, cleaned, repaired, or otherwise restored pan may then be installed (314).

Figure 5A:
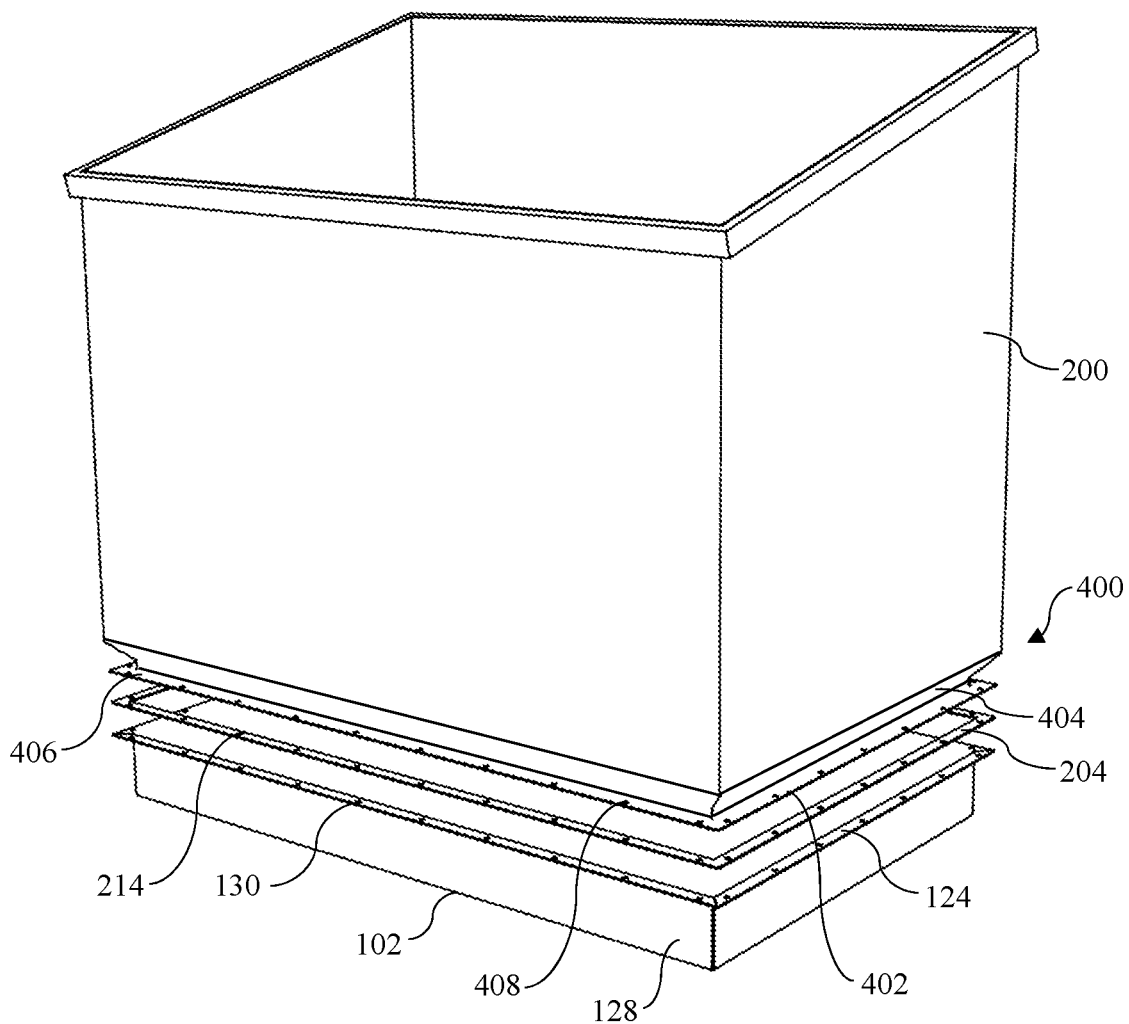
FIG. 5A is an exploded view of a container with a tapered adapter and a replaceable bottom pan according to an embodiment.
Figure 5B:
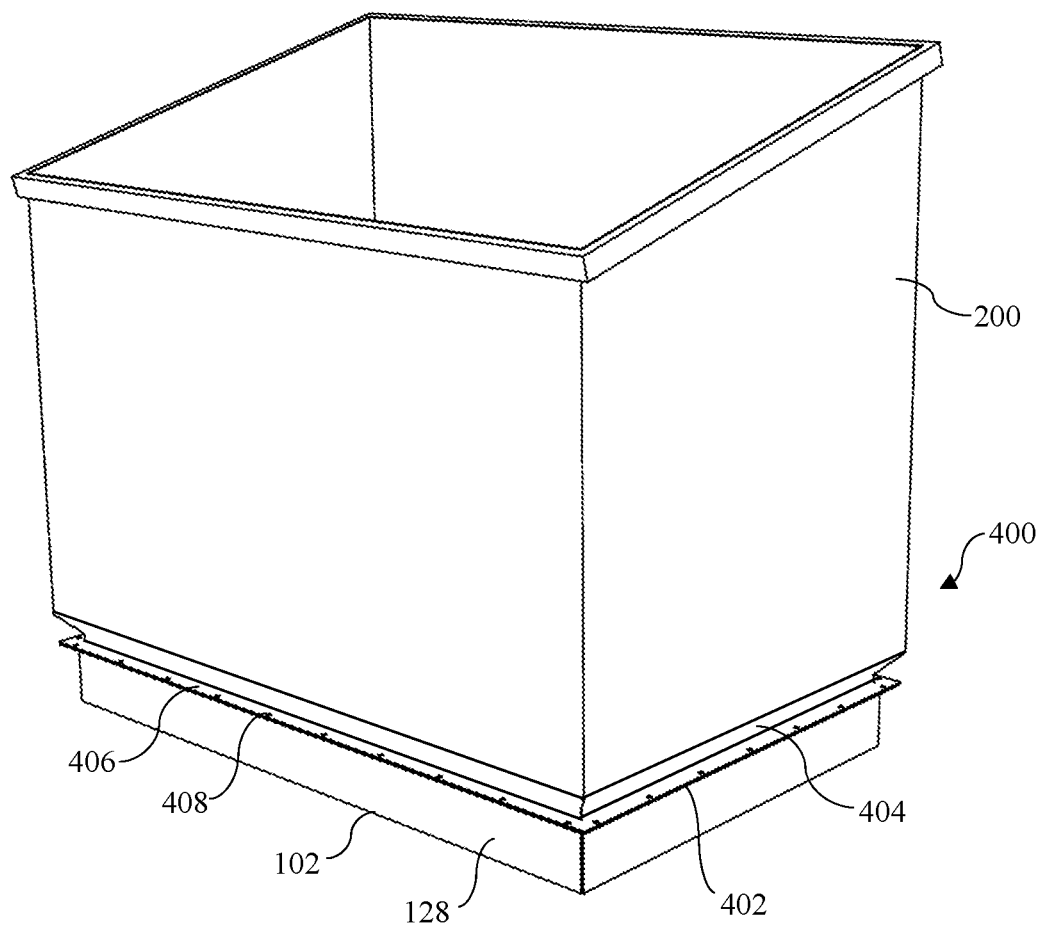
FIG. 5B is a perspective assembled view of FIG. 5A.
Figure 5C:
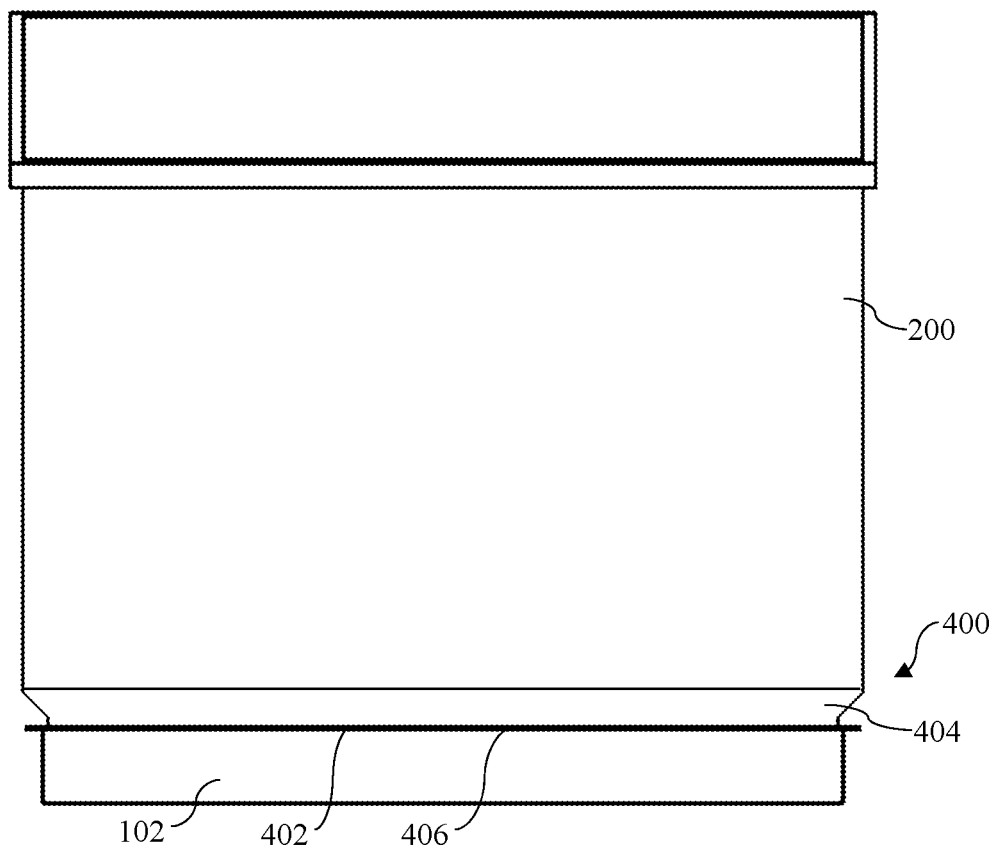
FIG. 5C is a front assembled view of FIG. 5A.

Referring now to FIGS. 5A-5C, bottom pan adapter system 400 for attaching bottom pan 102 to container 200 is depicted. Bottom pan adapter system 400 includes bottom pan 102, tapered adapter 402, and optionally gasket 204. Tapered adapter 402 can comprise, adapter connecting wall 404, and adapter base 406. Adapter connecting wall 404 can extend outward from the interior perimeter of adapter base 406 at an angle such that the exterior perimeter of adapter connecting wall 404 is larger than the exterior perimeter of adapter base 406. In embodiments, adapter connecting wall 404 can protrude orthogonally from adapter base 406 before proceeding to extend outward, as more clearly depicted in FIG. 5C. The exposed end of adapter connecting wall 404 provides a container-abutting surface for attachment to the structure of container 200, such as by welding. In embodiments, adapter connecting wall 404 provides clearance during attachment to container 200. In embodiments, adapter connecting wall 404 can be cut such that the exterior perimeter of adapter connecting wall 404 is substantially the same as the exterior perimeter of container 200. Adapter base 406 provides a pan-abutting face or surface for attachment to bottom pan 102. Adapter base 406 can include adapter base apertures 408 configured to align with corresponding flange apertures 130 such as with bolts or other suitable fasteners. Bottom pan 102 can be connected to, or removed from, adapter base 406 entirely from the outside of the container; that is, without accessing the interior, refuse-containing portion of the container. In embodiments, one tapered adapter 402 can be used interchangeably with multiple bottom pans.

Figure 6A:
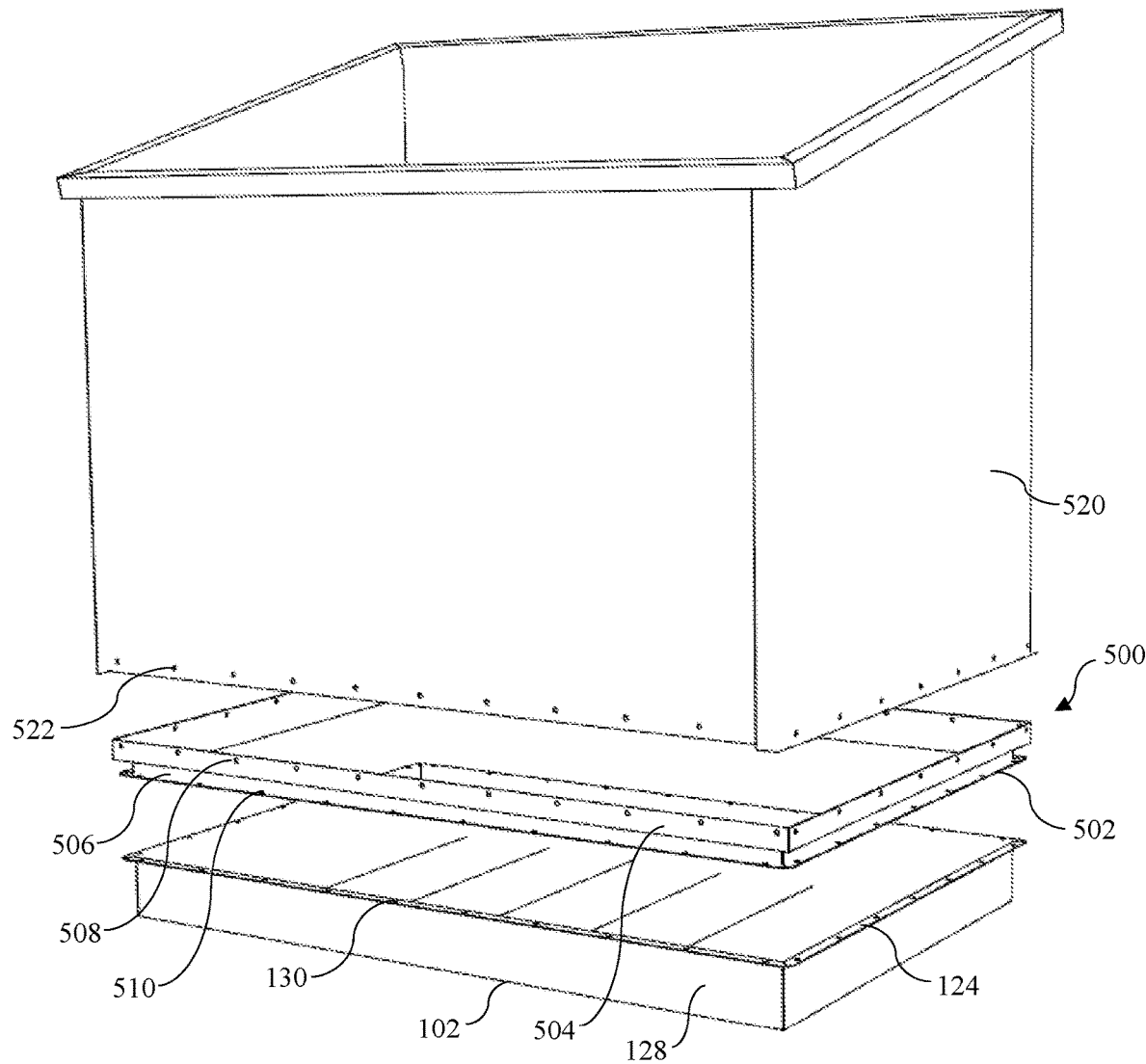
FIG. 6A is an exploded view of a container with a bolt-on adapter and a replaceable bottom pan according to an embodiment.
Figure 6B:
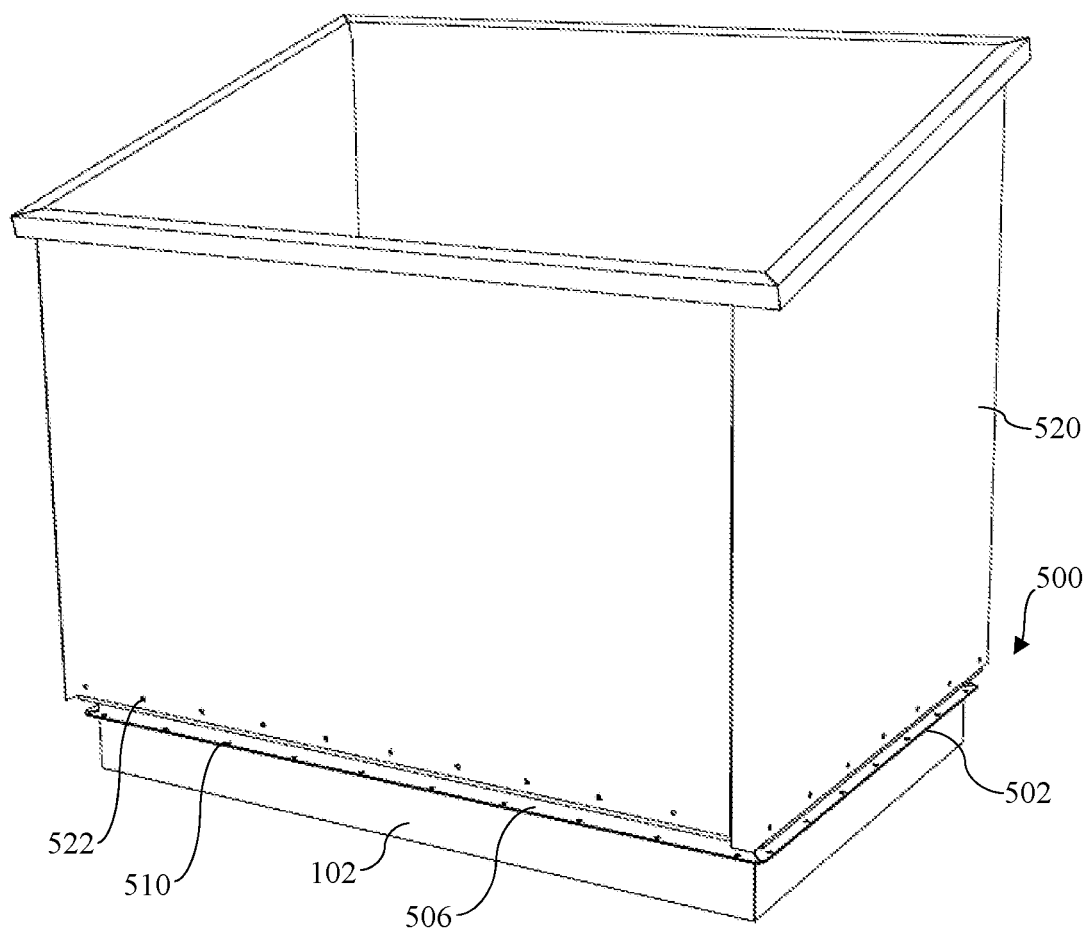
FIG. 6B is a perspective assembled view of FIG. 6A.

Referring now to FIG. 6A-6B, a bolt-on embodiment of bottom pan adapter system 500 for attaching bottom pan 102 to container 520 is depicted. Container 520 can comprise container wall apertures 522 along the base of the walls of container 520. Bottom pan adapter system 500 includes bottom pan 102, vertical adapter 502, and optionally gasket 204 (not shown). Vertical adapter generally comprises adapter connecting wall 504, and adapter base 506. Adapter connecting wall 504 extends orthogonally from the interior perimeter of adapter base 406. In embodiments, adapter connecting wall 404 can include adapter connecting wall apertures 508 configured to be affixed to container 520 through container wall apertures 522 with fasteners. In embodiments, adapter connecting wall 404 can fastened to the interior of the container or the exterior of the container. Adapter base 506 provides a pan-abutting face or surface for attachment to bottom pan 102. Adapter base 506 can include adapter base apertures 510 configured to align with corresponding flange apertures 130 as with bolts or other suitable fasteners. Bottom pan 102 can be connected to, or removed from, adapter base 506 entirely from the outside of the container; that is, without accessing the interior, refuse-containing portion of the container. In embodiments, one vertical adapter 502 can be used interchangeably with multiple bottom pans.

Various embodiments of pans are depicted in FIGS. 7A-7H. Bottom pan 102 can be replaced or interchanged with the depicted pans so long as the dimensions of the pans being interchanged are substantially similar. These embodiments of pans can be used with an adapter embodiments described herein.

Figure 7A:
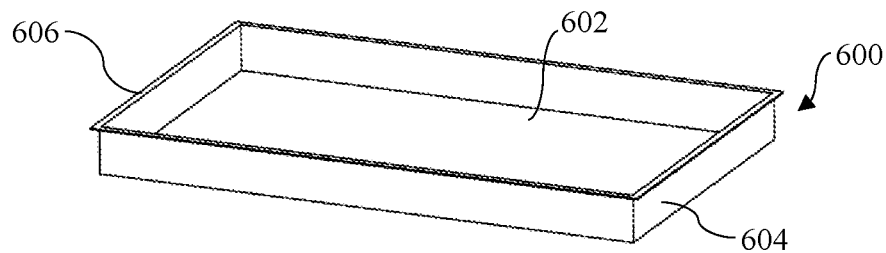
FIGS. 7A, 7B, 7C, 7D, 7E, 7F, 7G, and 7H are perspective views of replaceable bottom pans according to embodiments.

FIG. 7A depicts a bottom pan 600 that can be used interchangeably with bottom pan 102. In embodiments, bottom pan 600 can comprise pan base 602, pan sidewalls 604, and flange 606. Pan sidewalls 604 protrude orthogonal around the perimeter of pan base 602 from one side such that bottom pan 102 is capable of holding liquid without leakage. Flange 606 is affixed to pan sidewalls 128 and configured to be coupled to a container or an adapter of the present disclosure. In some embodiments, flange 606 can comprise a plurality of flange apertures (not shown). The plurality of flange apertures can be arranged around the perimeter of flange 606 and are configured to align with corresponding apertures of a container or adapter of the present disclosure such as with bolts or other suitable fasteners.

Figure 7B:
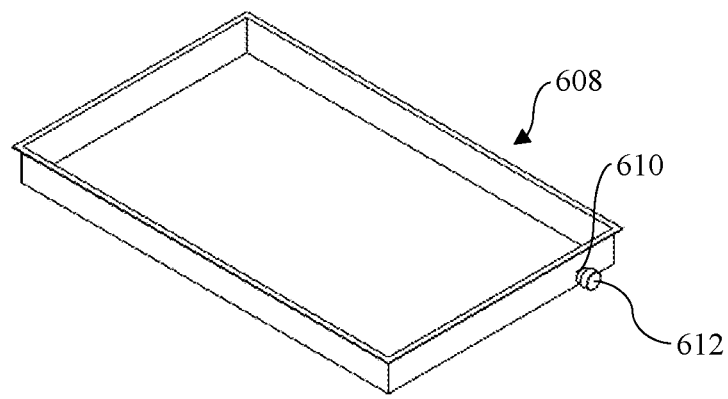

As depicted in FIG. 7B, a drainable bottom pan 608 can be structurally substantially similar to bottom pan 600 and include at least one pan drain 610 and drain cover 612. Pan drain 610 is a break in the pan sidewall and is configured to selectively allow liquid collected at the bottom of drainable bottom pan 608 to drain out when drain cover 612 is removed. In embodiments, pan drain 610 can simplify cleaning of drainable bottom pan 608 when attached to a container and reduce the risk of corrosion. In embodiments, pan drain 610 can be coupled to a filtration pump such that methane produced from the waste material within a coupled container can be removed as fresh air is drawn in. Once the methane has been removed from drainable bottom pan 608, the methane can be filtered or otherwise treated.

Figure 7C:
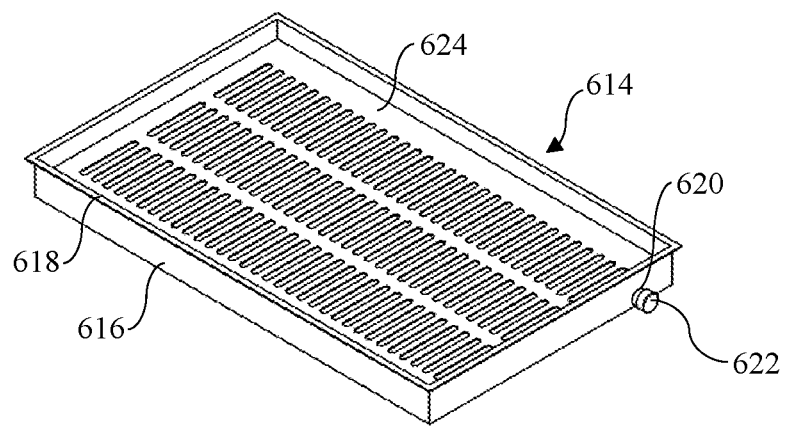

As depicted in FIG. 7C, drainable pan 614 can comprise a base, pan sidewalls 616, flange 618, pan drain 620, drain cap 622, and grated pan surface 624. Grated pan surface 624 can be coupled to pan sidewalls 616 such that grated pan surface 624 is positioned above the base of drainable pan 614 but no higher than flange 618. Grated surface 624 can be configured to ensure solid waste materials are elevated above the base of drainable pan 614 such that pan drain 620 can allow fluid drainage without being plugged by the solid waste. In embodiments, grated surface 624 can freely resting on protrusions (not shown) from pan sidewalls 616 such that grated surface 624 can be removed if necessary.

Figure 7D:
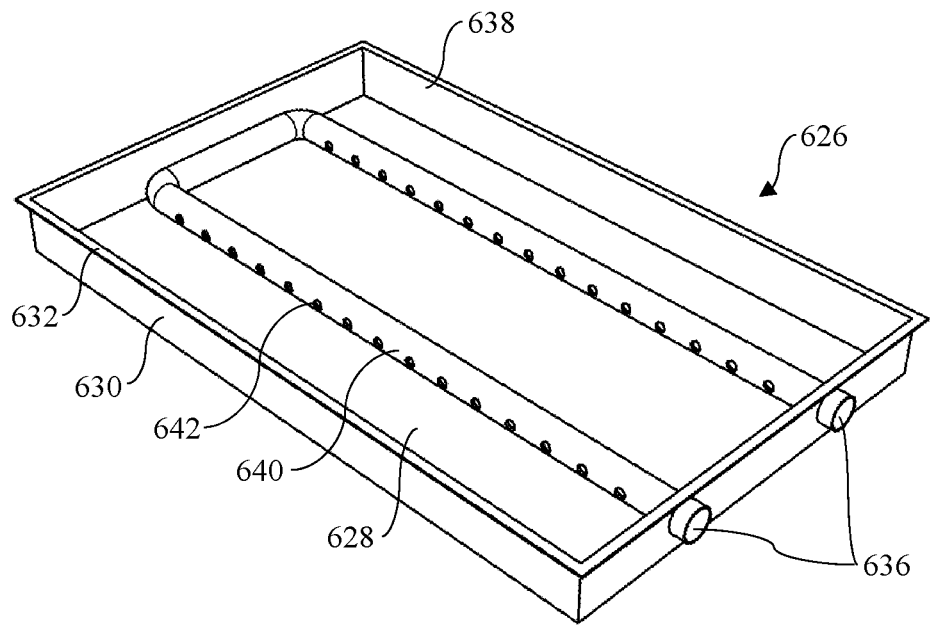
Figure 7E:
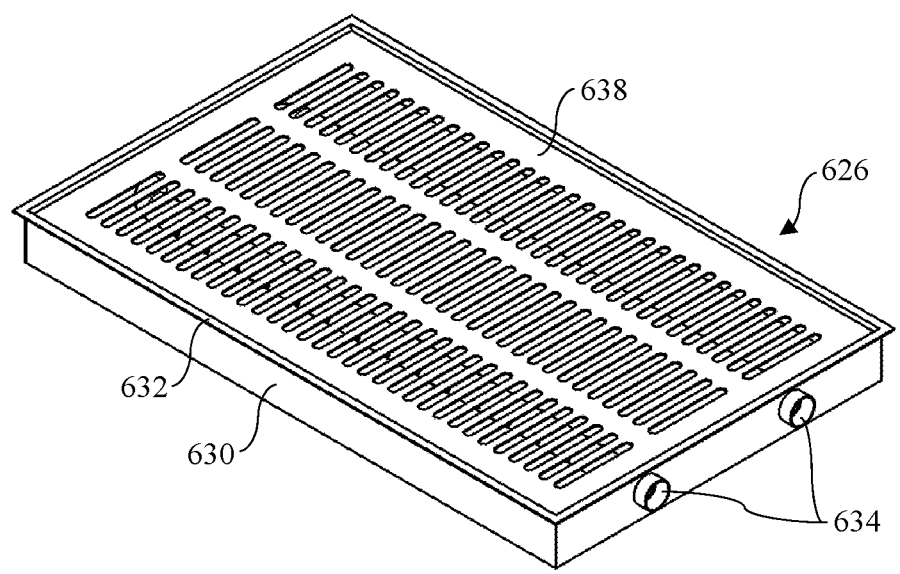

As depicted in FIGS. 7D-7E, drainable bottom pan 626 can comprise pan base 628, pan sidewalls 630, flange 632, pan drains 634, drain caps 636, and grated pan surface 638, and at least one draining tube 640. In this embodiment, draining tube 640 can include a plurality of draining tube apertures 642 configured to allow fluid to enter draining tube 640. Draining tube 640 can be coupled to pan drains 634 within sidewalls 630 to allow liquid to be drained from drainable bottom pan 626. In embodiments, pan drains 634 can be coupled to a filtration pump such that methane produced from the waste material within a coupled container can be removed as fresh air is drawn in. In embodiments, draining tube 640 can be integrated into pan base 628. Grated pan surface 638 can be permanently affixed to pan sidewalls 630 or simply rest on draining tube 640.

Figure 7F:
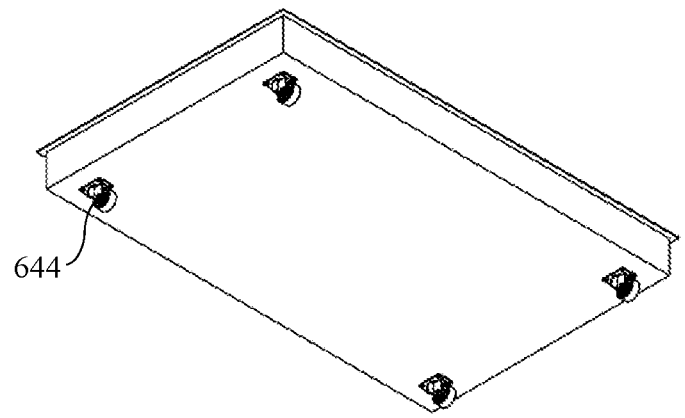

As depicted in FIG. 7F, a bottom pan, such as bottom pan 102 or drainable bottom pan 608, can comprise casters 644. Casters 644 can be removably coupled to the base of the bottom pan such that the bottom pan and a coupled container (not shown) can be easily rolled. In embodiments, four casters 644 are used. In embodiments, casters 644 can include dampeners or suspension mechanisms to reduce the force placed on the bottom pan when placed on the ground. Such dampening is particularly useful as many containers are lifted and dropped during the emptying process.

Figure 7G:
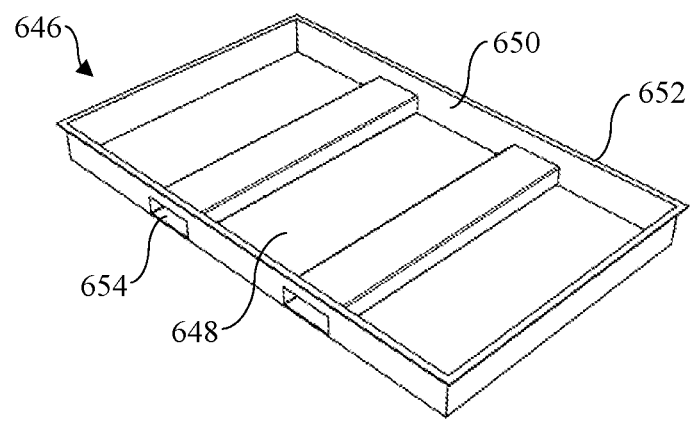

As depicted in FIG. 7G, fork lift bottom pan 646 can include pan base 648, pan sidewalls 650, flange 652, and at least 2 fork lift channels 654. Fork lift channels 654 are configured to receive fork lift tines during a container 200 lift operation. Fork lift channels 654 can be incorporated into base 648 such that base 648 remains flat. In embodiments, fork lift channels 654 can span the distance between two parallel pan sidewalls 652 such that a fork lift operator can access fork lift channels 654 from either side of fork lift bottom pan 646. Fork lift channels 654 can strengthen the integrity of fork lift bottom pan 646 by acting as support beams capable of distributing experienced forces more evenly across fork lift bottom pan 646.

Figure 7H:
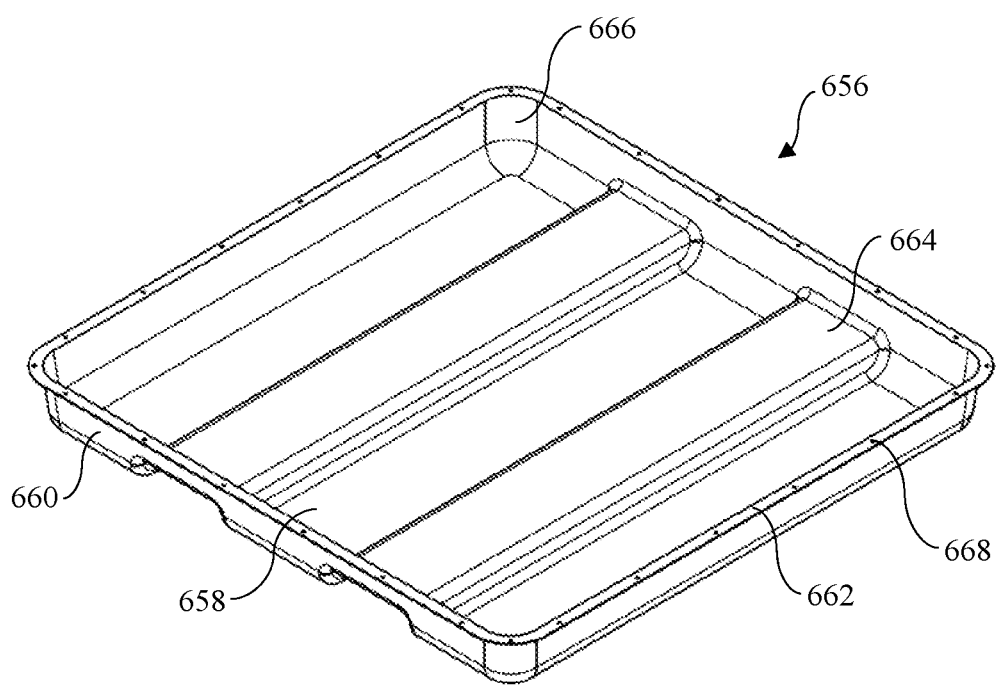
Figure 8A:
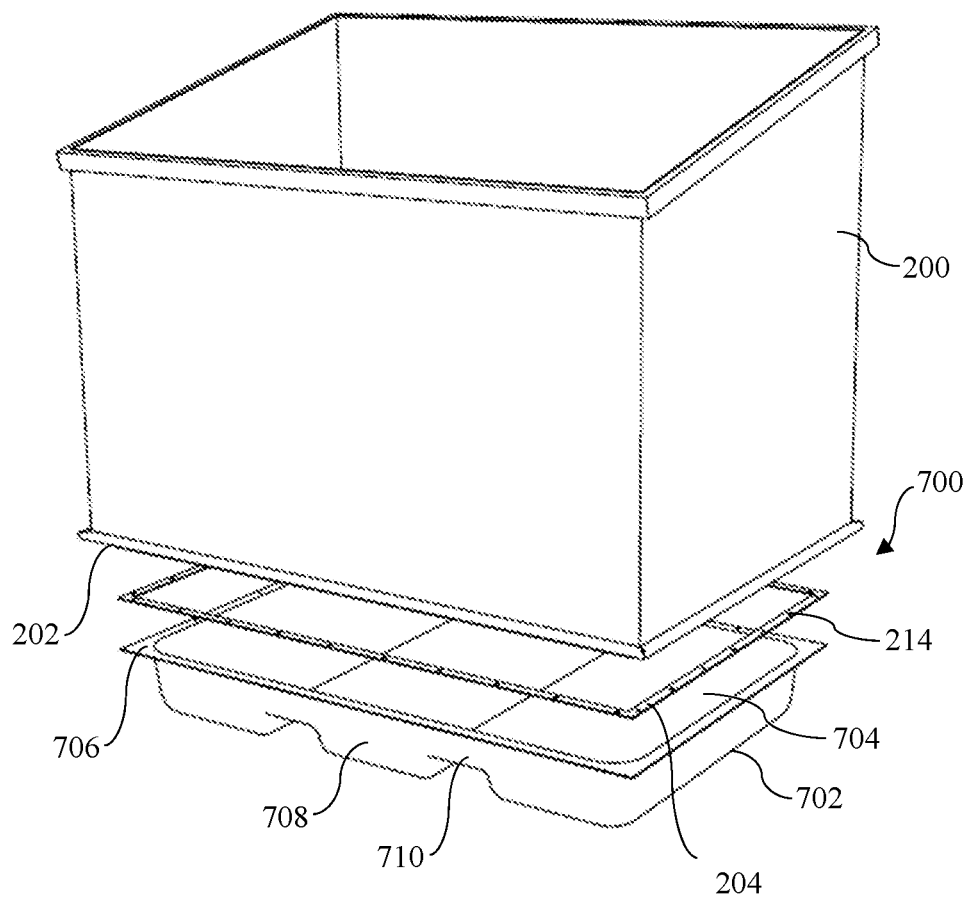
FIG. 8A is an exploded view of a container with a lip adapter and a replaceable bottom pan according to an embodiment.
Figure 8B:
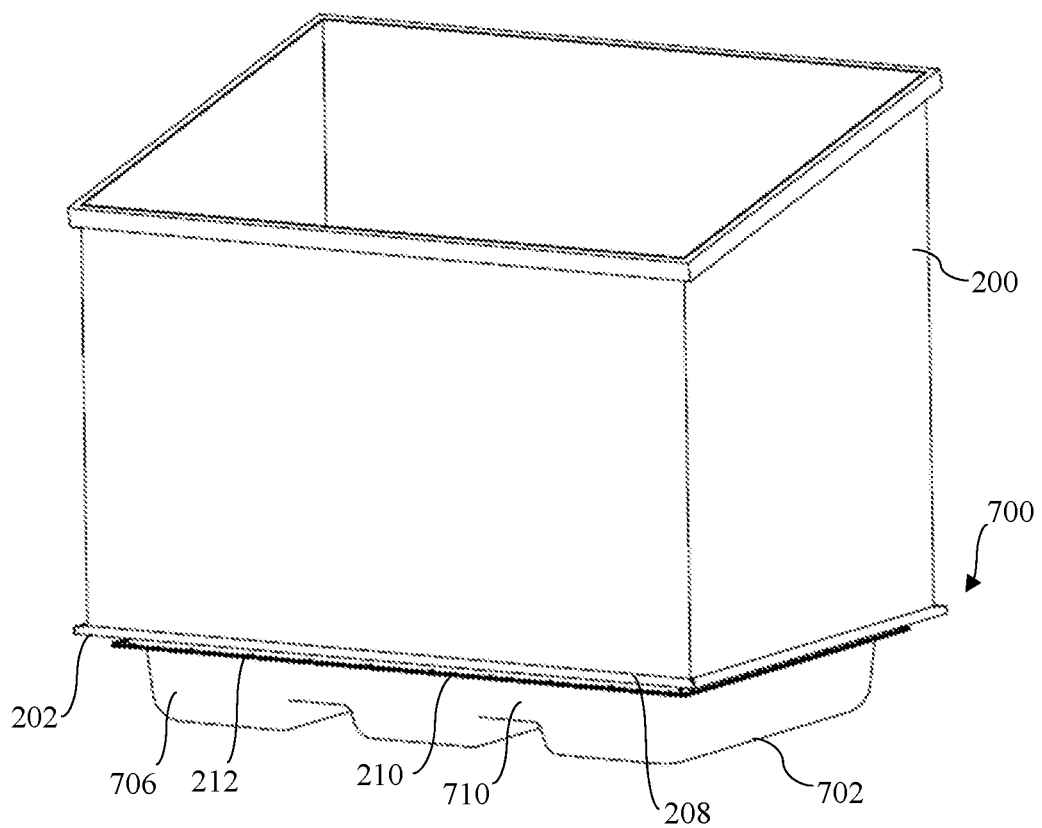
FIG. 8B is a perspective assembled view of FIG. 8A.
Figure 8C:
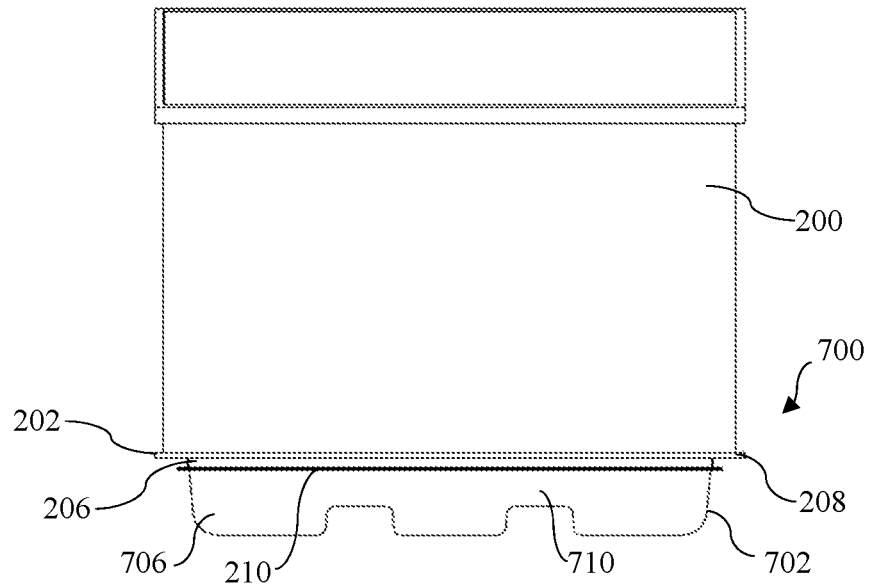
FIG. 8C is a front assembled view of FIG. 8A.
Figure 8D:
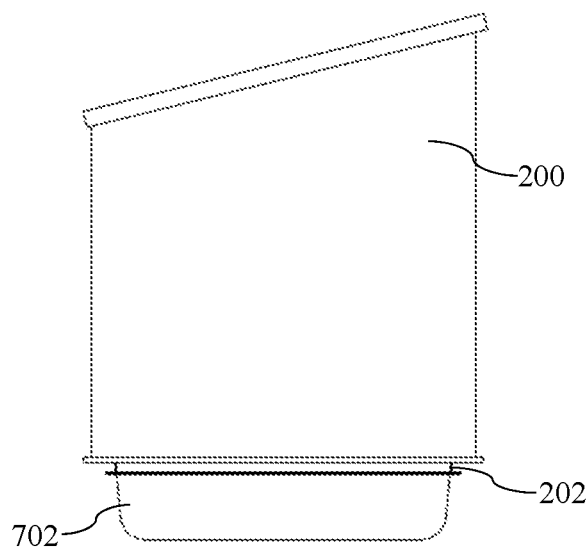
FIG. 8D is a side assembled view of FIG. 8A.
Figure 9A:
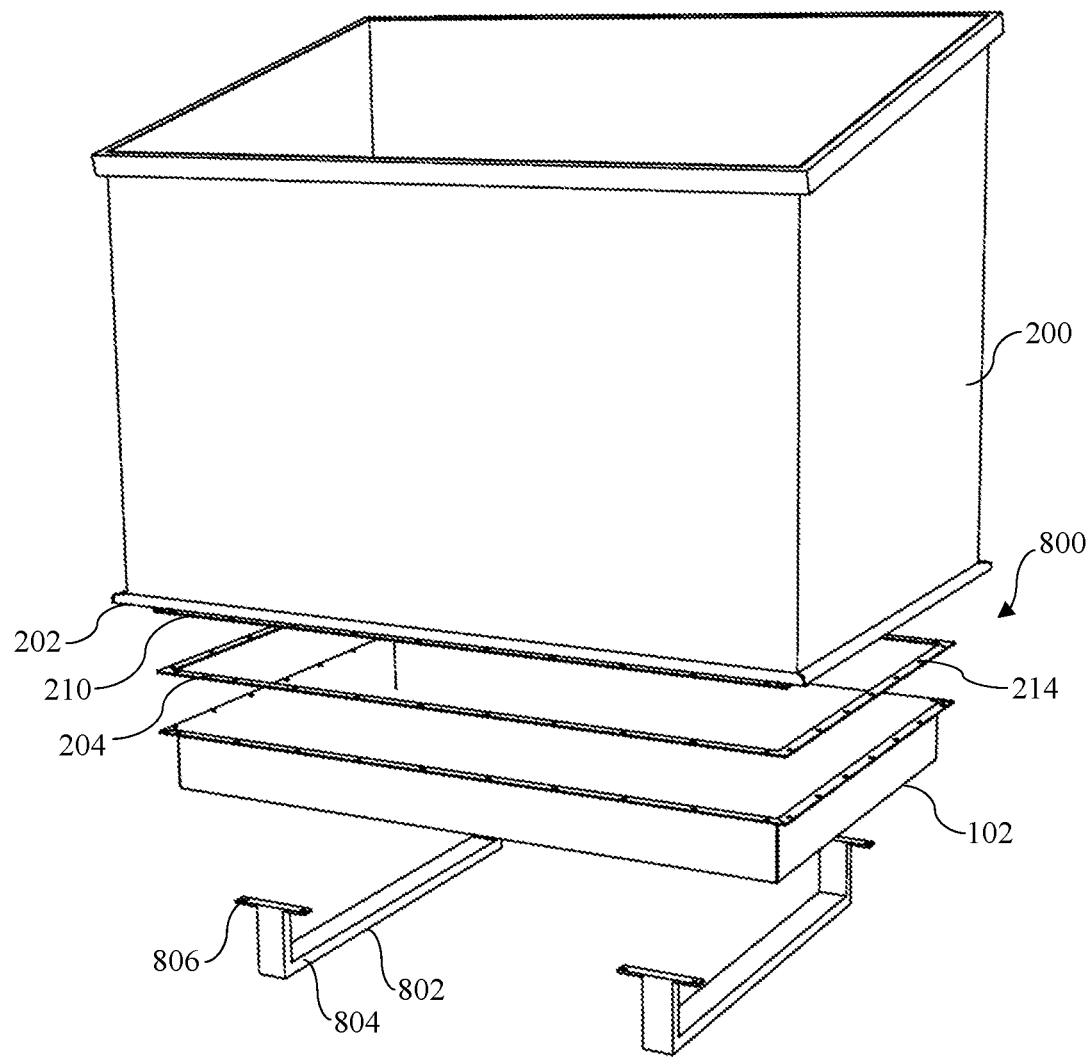
FIG. 9A is an exploded view of a container with a lip adapter, support brackets, and a replaceable bottom pan according to an embodiment.
Figure 9B:
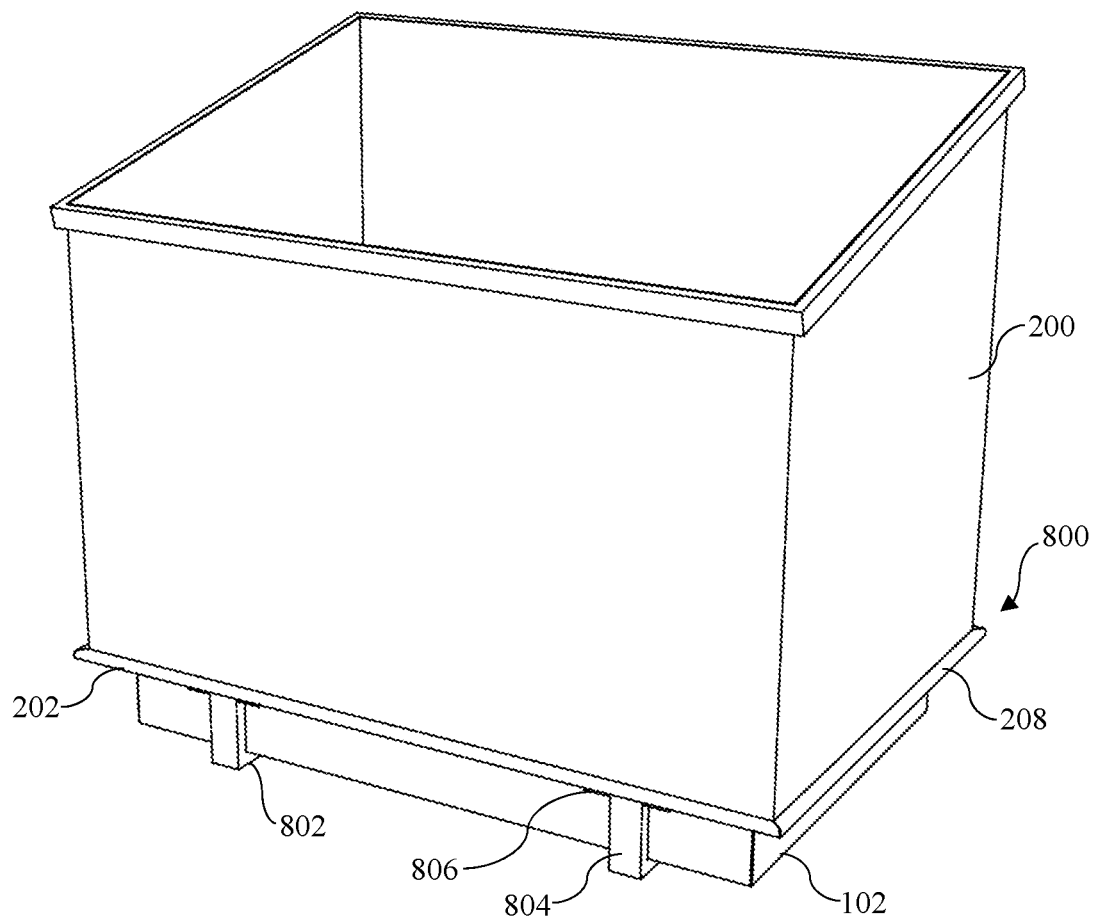
FIG. 9B is a perspective assembled view of FIG. 9A.
Figure 9C:
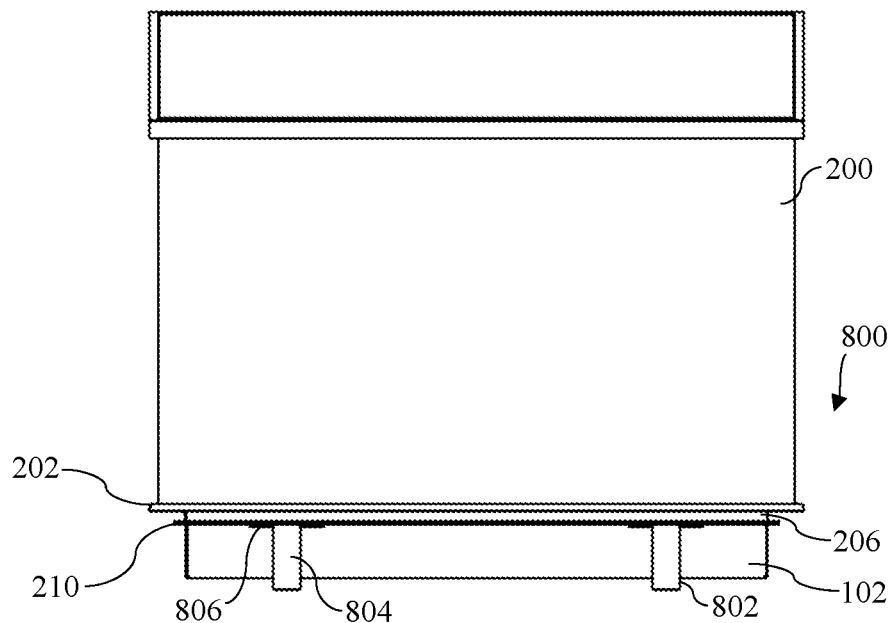
FIG. 9C is a front assembled view of FIG. 9A.
Figure 9D:
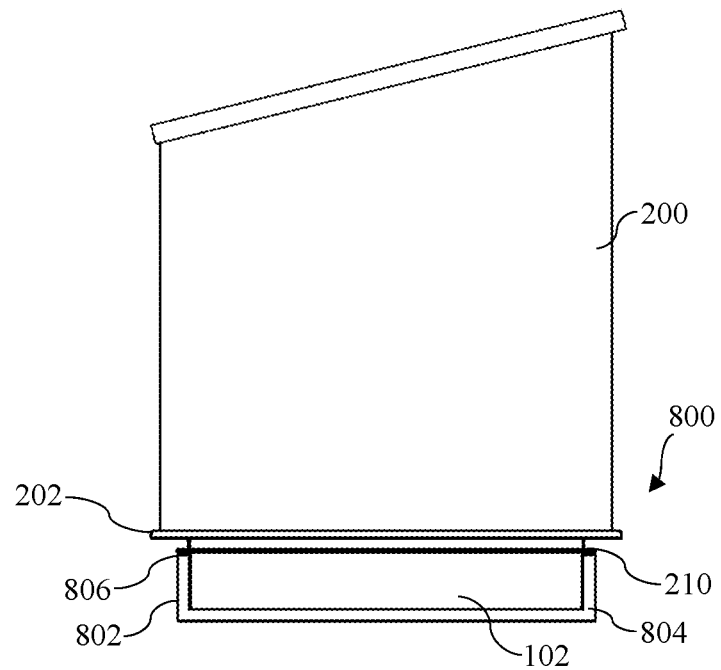
FIG. 9D is a side assembled view of FIG. 9A.
Figure 10A:
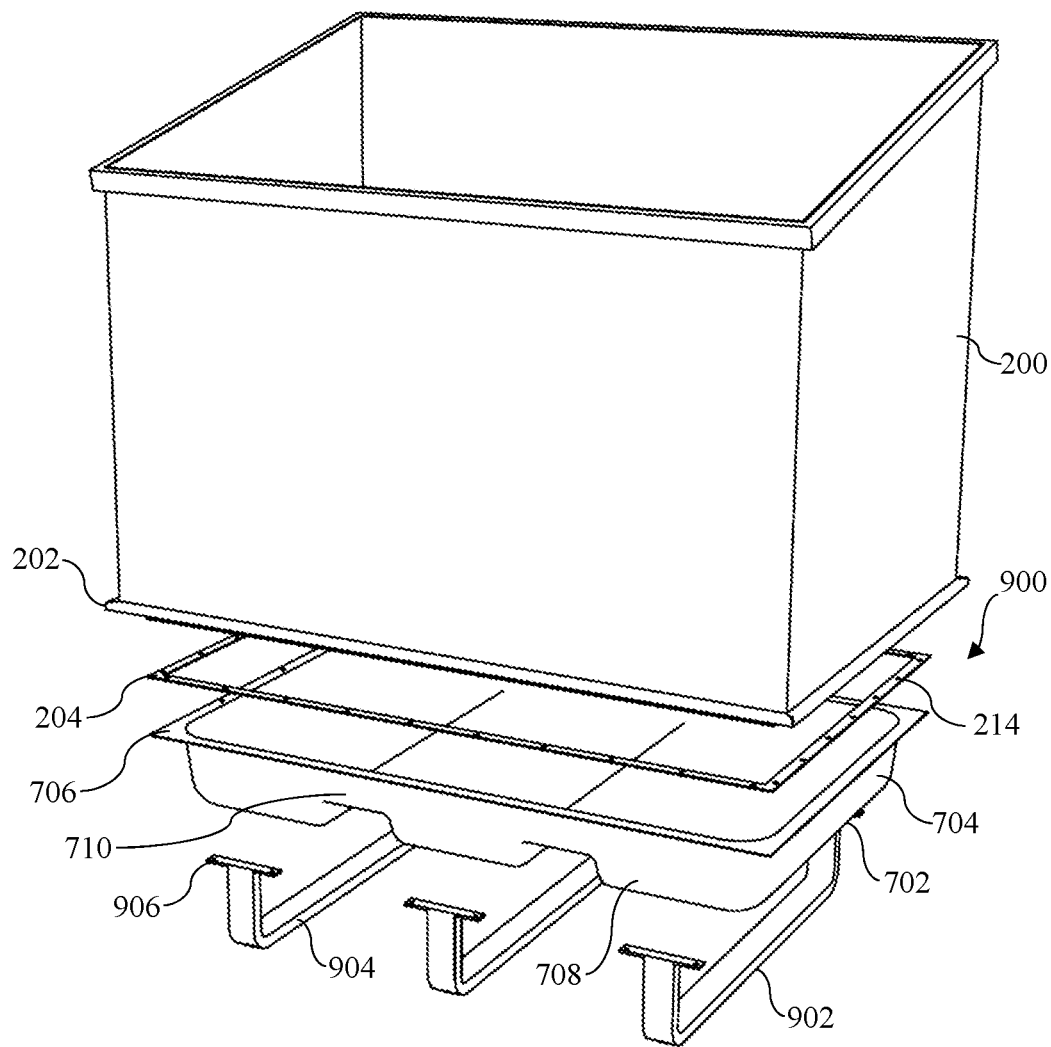
FIG. 10A is an exploded view of a container with a lip adapter, support brackets and a replaceable bottom pan according to an embodiment.
Figure 10B:
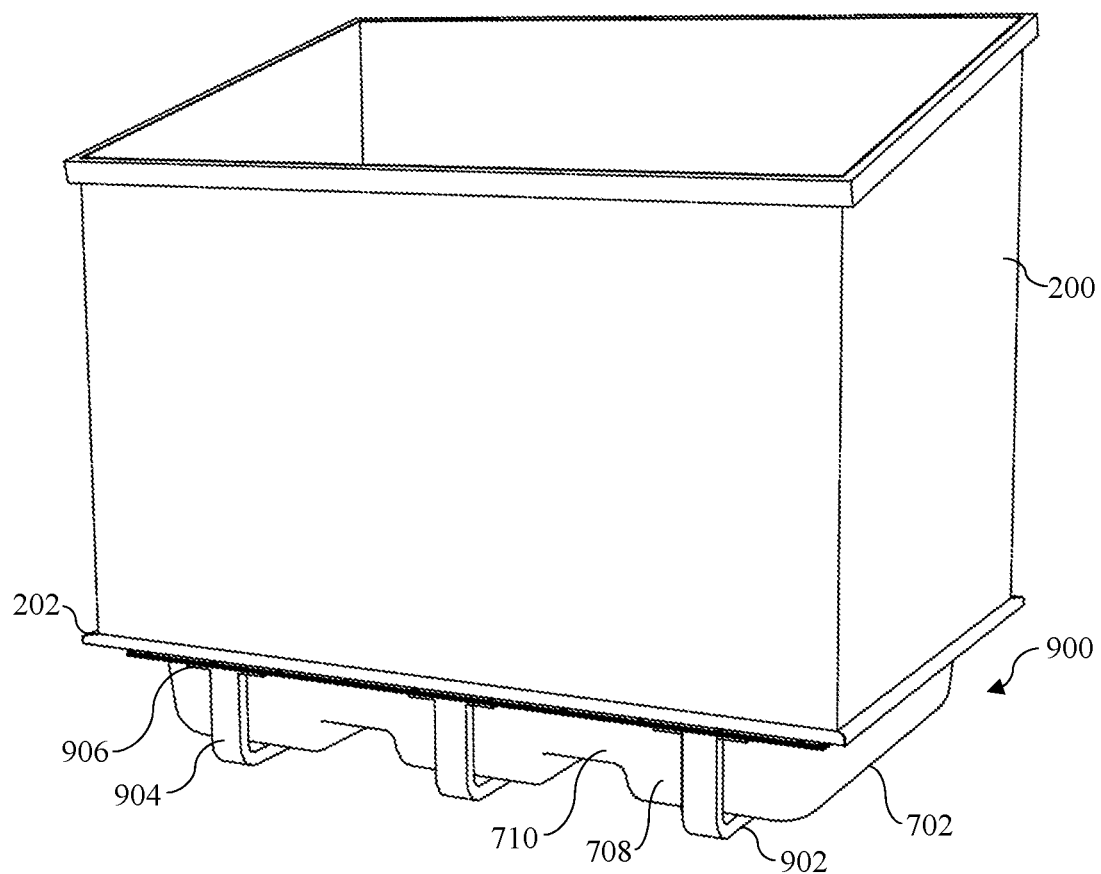
FIG. 10B is a perspective assembled view of FIG. 10A.
Figure 10C:
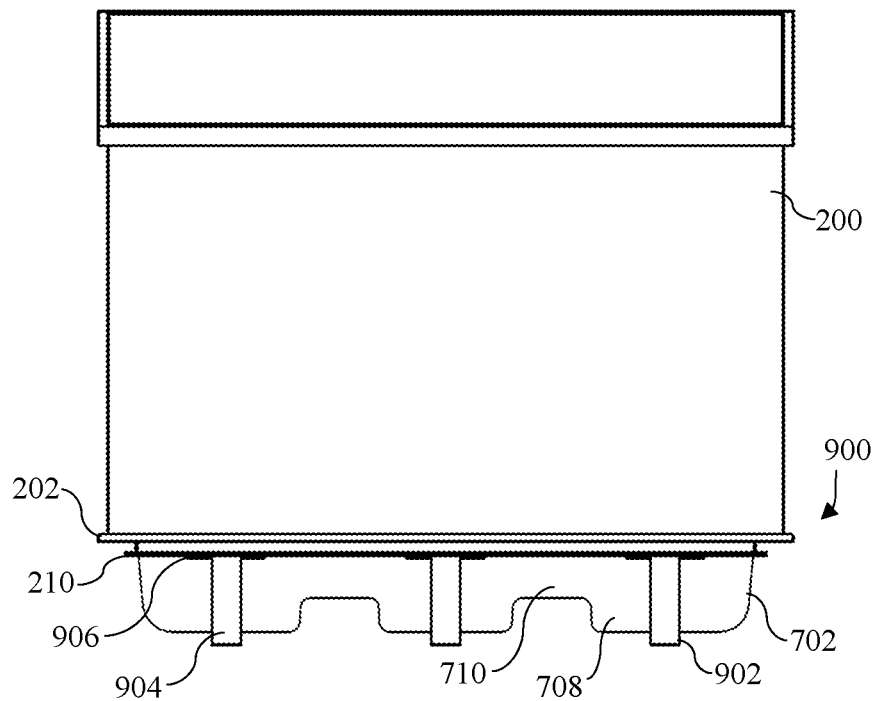
FIG. 10C is a front assembled view of FIG. 10A.
Figure 10D:
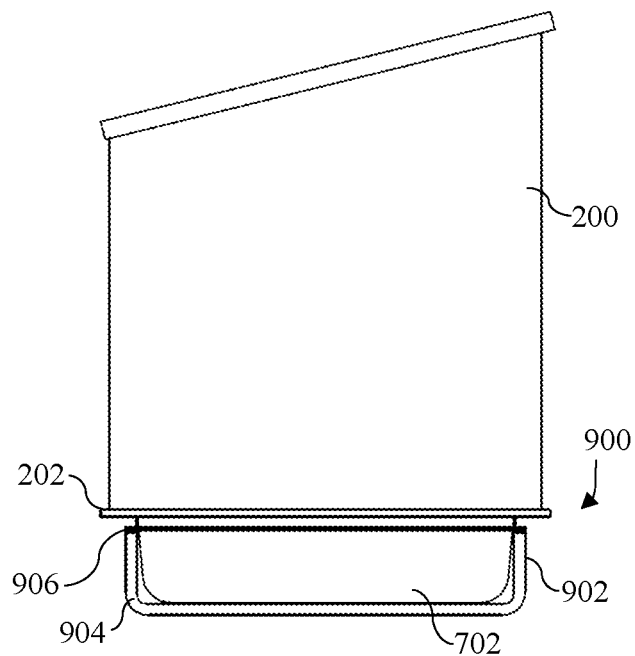
FIG. 10D is a side assembled view of FIG. 10A.
Figure 11A:
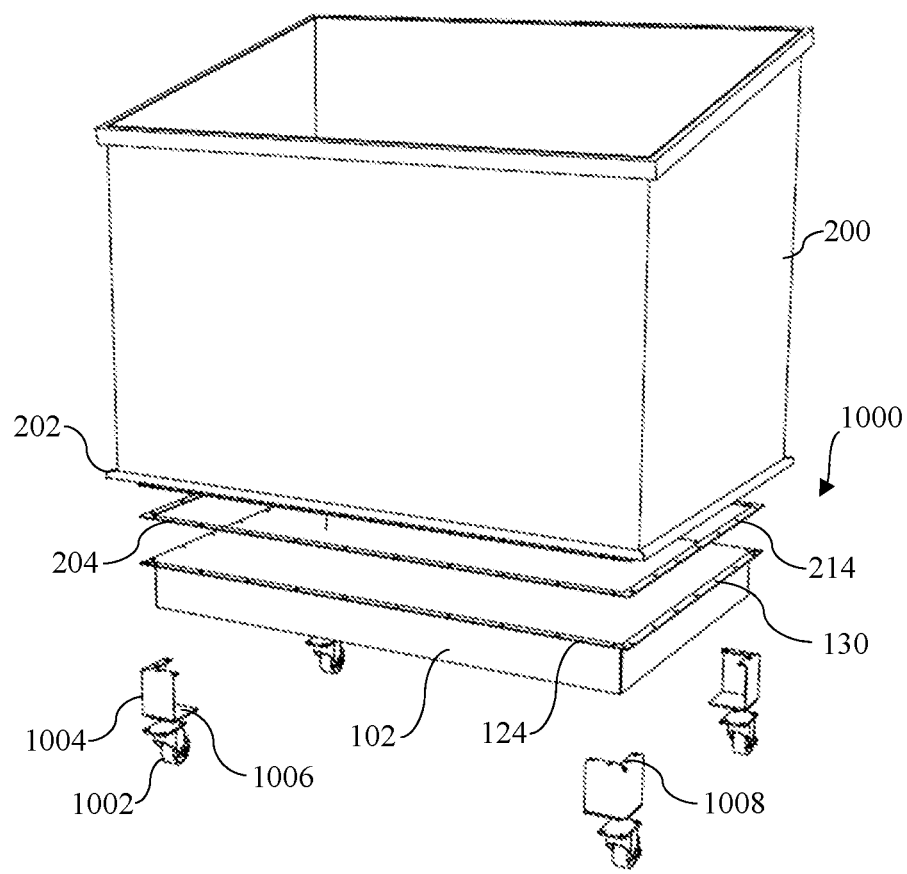
FIG. 11A is an exploded view of a container with a lip adapter, casters, corner brackets, and a replaceable bottom pan according to an embodiment.
Figure 11B:
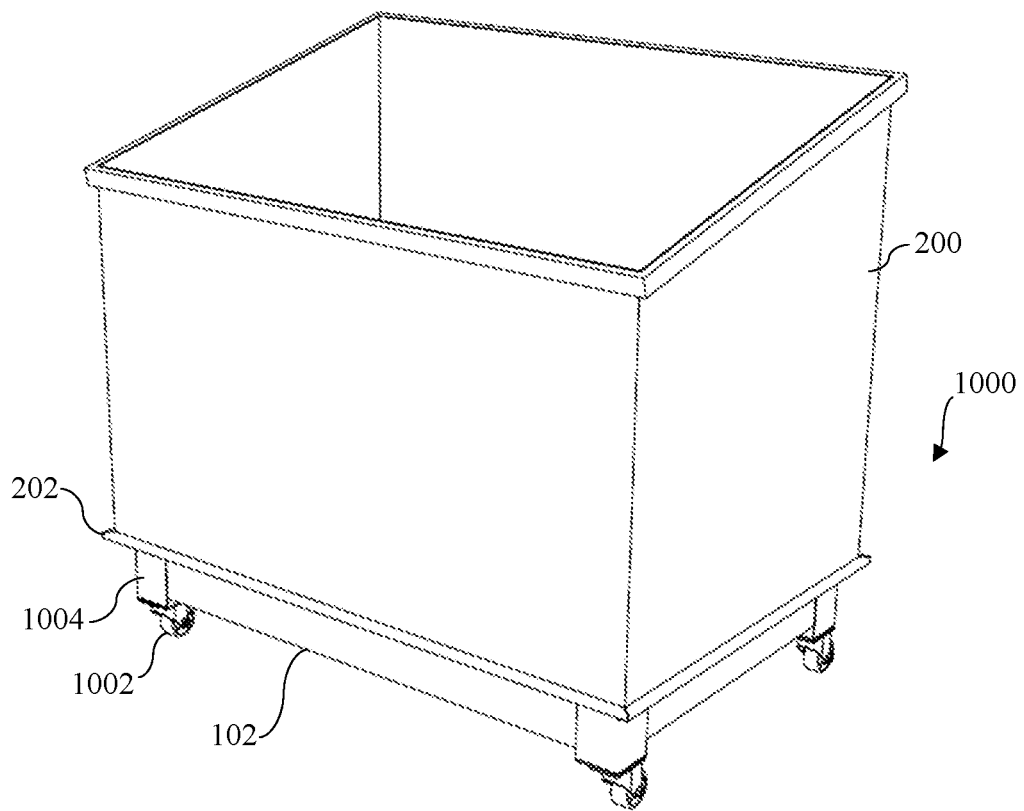
FIG. 11B is a perspective assembled view of FIG. 11A.
Figure 11C:
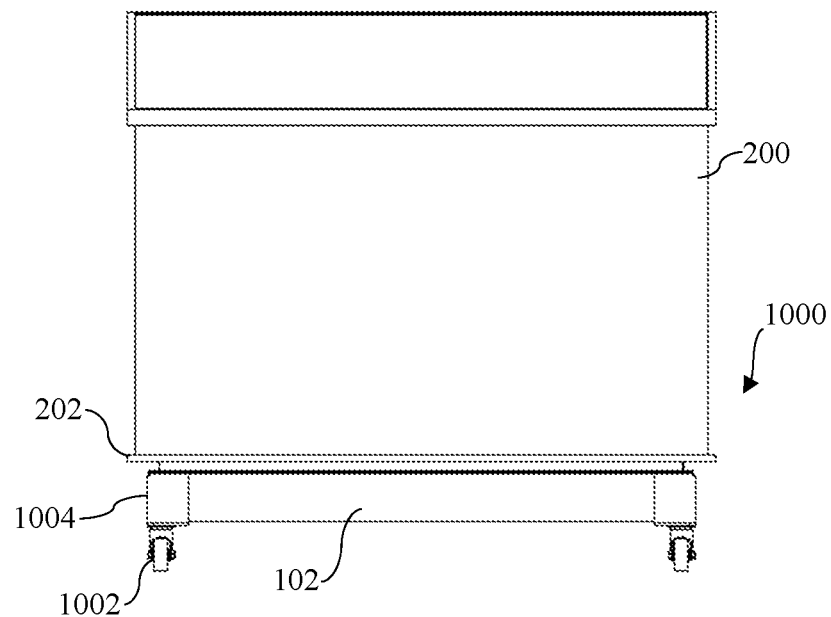
FIG. 11C is a front assembled view of FIG. 11A.
Figure 11D:
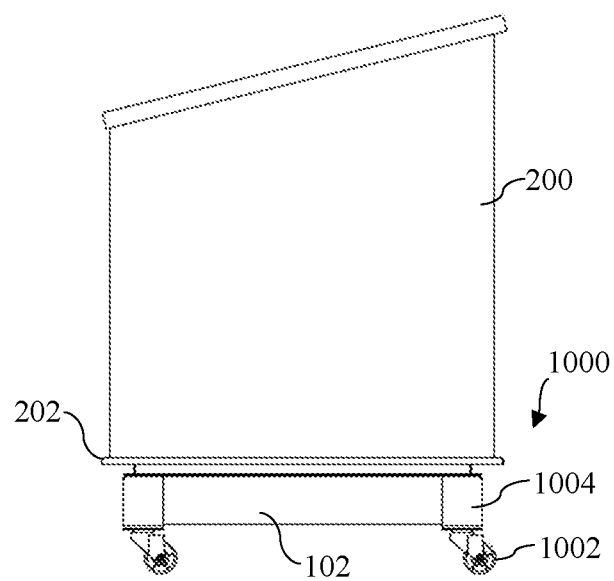
FIG. 11D is a side assembled view of FIG. 11A.
Figure 12A:
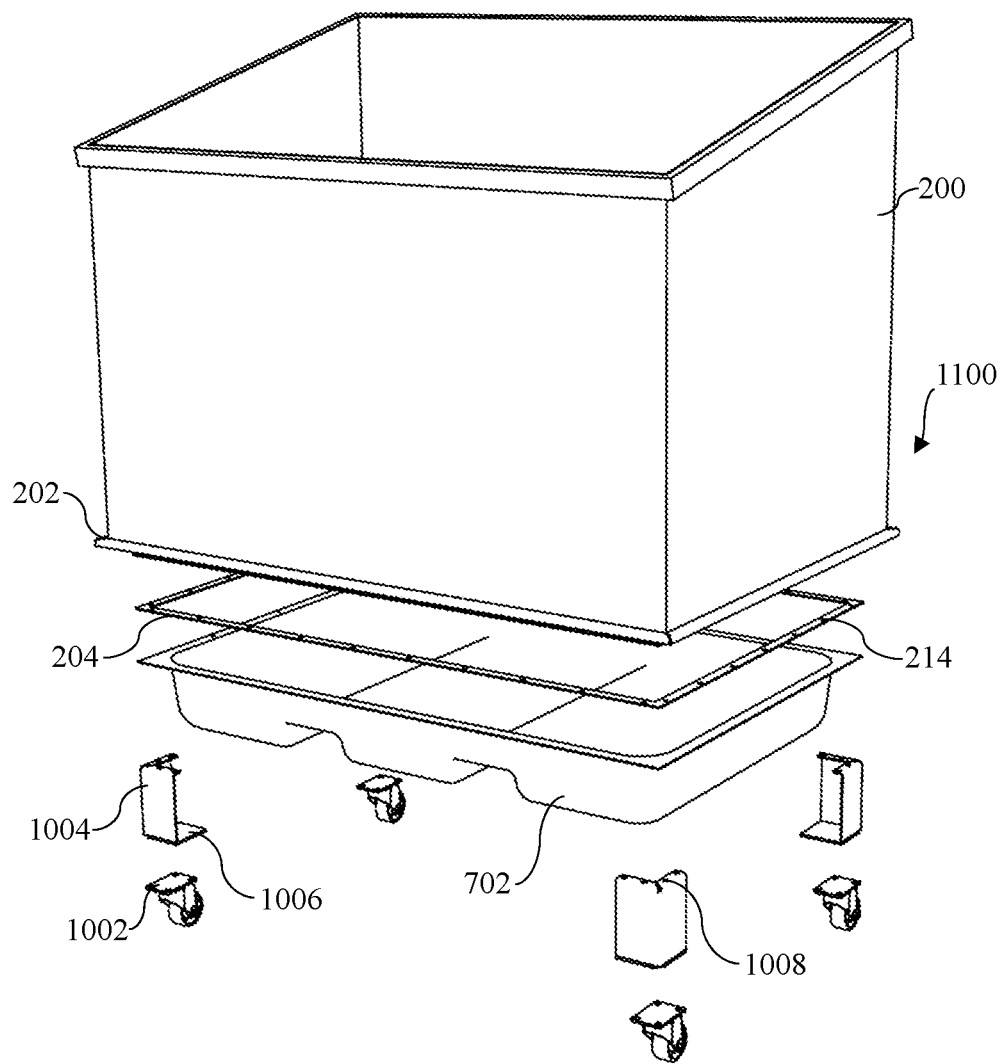
FIG. 12A is an exploded view of a container with a lip adapter, casters, corner brackets, and a replaceable bottom pan according to an embodiment.
Figure 12B:
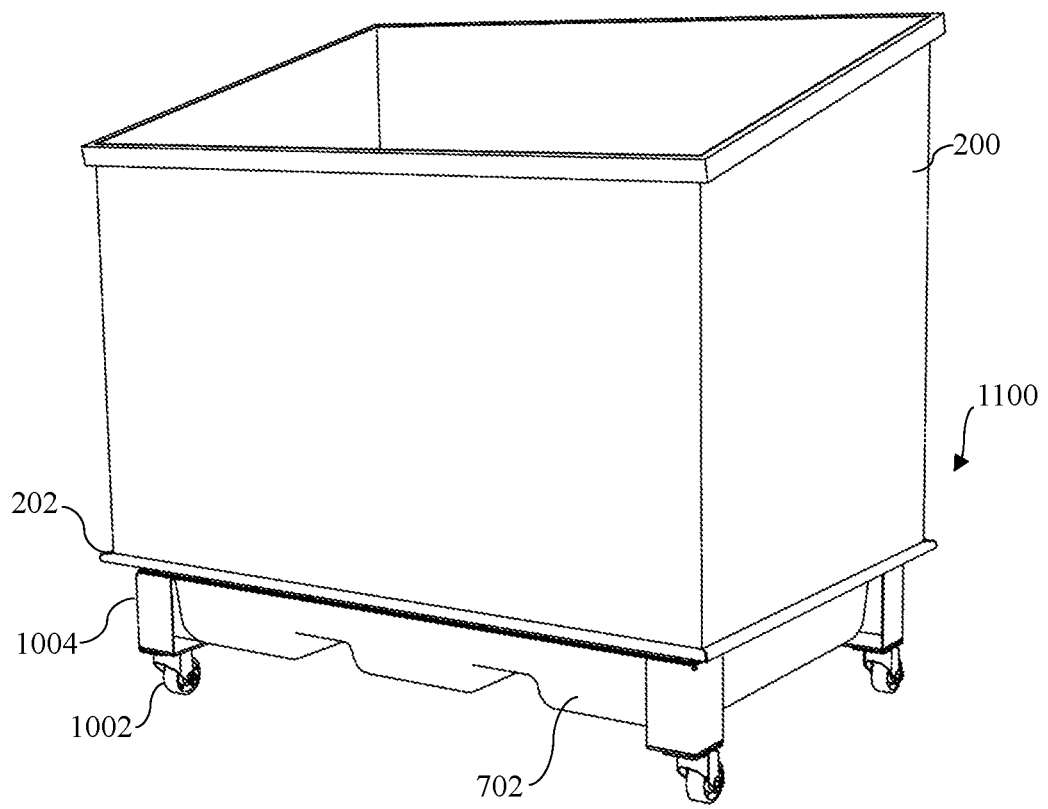
FIG. 12B is a perspective assembled view of FIG. 12A.
Figure 12C:
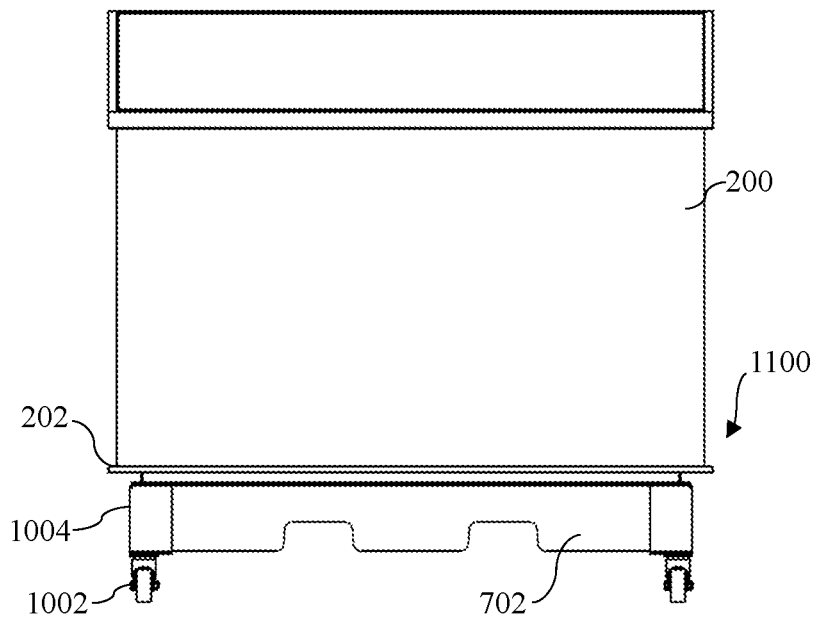
FIG. 12C is a front assembled view of FIG. 12A.
Figure 12D:
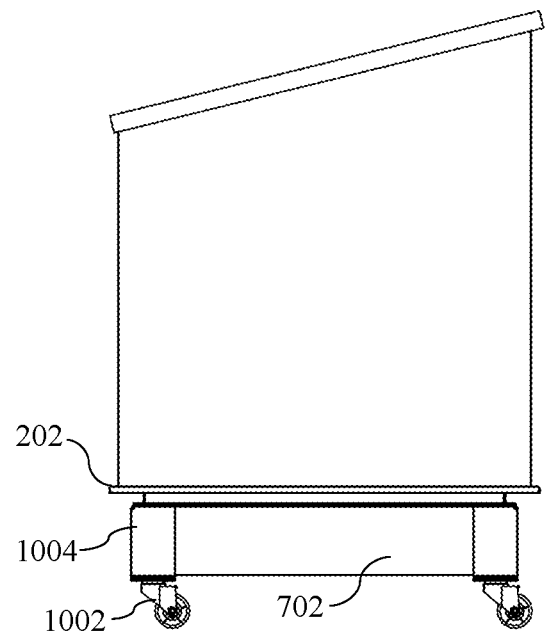
FIG. 12D is a side assembled view of FIG. 12A.

Referring now to FIG. 7H, a reinforced bottom pan 656 is depicted according to an embodiment. Reinforced bottom pan 656 generally comprises pan base 658, pan sidewalls 660, flange 662, reinforcement channels 664, and optionally rounded corners 666. In embodiments, flange 662 can include flange apertures 668 configured to couple to an adapter of the present disclosure or a container such as with bolts or other suitable fasteners.

Reinforcement channels 664 can strengthen the integrity of reinforced bottom pan 656 by acting as support beams capable of distributing experienced forces more evenly across reinforced bottom pan 656. Reinforcement channels 664 can serve as forklift channels and can span the distance between two parallel pan sidewalls 660 such that a fork lift operator can access reinforced channels 664 from either side of reinforced bottom pan 656. In embodiments, reinforced bottom pan 656 can include a plurality of reinforcement channels.

Reinforced pan 656 can comprise a variety of materials including steel or plastic or combinations thereof. In particular, the improved durability of reinforced pan 656 provided by reinforcement channels facilitates the use of plastics that may otherwise be too weak to survive repeated emptying processes. In embodiments, reinforced pan 656 can comprise a single piece of material.

Referring now to FIGS. 8A-8D, an embodiment of bottom pan adapter system 700 for attaching reinforced bottom pan 702 to container 200 is depicted. Bottom pan adapter system 700 includes lip adaptor 202, bottom pan 702, and optionally gasket 204. In embodiments, bottom pan 702 comprises a single piece of material and includes pan base 704 with flange 706, pan sidewalls 708, and reinforcement channels 710. In embodiments, pan sidewalls 708 extend outward from and around the perimeter of pan base 704, such that bottom pan 702 can hold liquid. Flange 708 extends from the exposed end of pan sidewalls 708 such that flange 708 substantially planar with bottom adapter lip 210. In embodiments, bottom pan 702 can be affixed to bottom adapter lip 210 without fasteners, such as by welding. In embodiments, flange 708 can include flange apertures (not shown) configured to couple to corresponding bottom adapter lip apertures 212, and optionally gasket apertures 214, such as with bolts or other suitable fasteners.

Flange 708 can have an exterior perimeter larger than, or substantially equal to the interior perimeter of bottom adapter lip 210. In instances where the exterior perimeter of flange 708 is larger than the exterior perimeter of bottom adapter lip 210, any excess of flange 708 can be cut away such that the exterior perimeters are substantially equal.

Reinforced channels 710 provide increased structural support to bottom pan 702 by distributing experienced forces more evenly. In embodiments, reinforced channels 710 can extend along the depth of bottom pan 702. In embodiments, reinforced channels 710 can serve as forklift channels. In embodiments, bottom pan 702 may be substantially similar to reinforced pan 656.

Referring now to FIGS. 9A-9D, bottom pan adapter system 800 for attaching bottom pan 102 to container 200 is depicted. Bottom pan adapter system 800 includes container 200, bottom pan 102, lip adapter 202, support brackets 802, and optionally gasket 204. Support brackets or beams 802 comprise support arms 804 having a first end and a second end with connection surfaces 806. Support arms 804 are bent along their length such that bottom pan 102 can fit between the bends and connection surfaces 806 are planar with bottom adapter lip 210. In embodiments, bottom pan 102 can have an interference fit or clearance fit with support brackets 802. In embodiments, connection surfaces 806 can be affixed to bottom adapter lip 210 without fasteners, such as by welding. In other embodiments, connection surfaces 806 can include flange apertures (not shown) configured to couple to corresponding apertures along bottom adapter lip 210 (not shown) such as with nuts and bolts or other suitable fasteners.

In embodiments, support brackets 802 are configured to keep bottom pan 102 from contacting the ground which can be beneficial in certain conditions. For example, in extreme cold weather certain materials such as plastic can become brittle and have a heightened risk of damage if moved during the emptying process of container 200. Therefore, structural stability and protection provided by support brackets 208 facilitate the use of bottom pans made from non-metal materials that are more resilient to corrosion but lack the durability of metals. Brackets 802 may thus comprise a protective cage around bottom pan 102. Further, brackets 802 may be easier and cheaper to replace than bottom pan (e.g., from wear and tear).

Referring now to FIGS. 10A-10D, bottom pan adapter system 900 for attaching bottom pan 102 to container 200 is depicted. Bottom pan adapter system 900 includes bottom pan 702, lip adapter 202, support brackets 902, and optionally gasket 204. Support brackets 902 comprise support arms 904 having a first end and a second end with connection surfaces 906 at both ends. Support arms 904 have a curve bent along their length such that bottom pan 702 can fit between the bends and connection surfaces 906 are planar with bottom adapter lip 210. In embodiments, three support brackets 902 are positioned along the depth of bottom pan 702 such that reinforced channels 710 remain unblocked. In embodiments, bottom pan 702 can have an interference fit or clearance fit with support brackets 902. In embodiments, connection surfaces 906 can be affixed to bottom adapter lip 210 without fasteners, such as by welding. In other embodiments, connection surfaces 906 can include flange apertures (not shown) configured to couple to corresponding apertures along bottom adapter lip 210 (not shown) such as with nuts and bolts or other suitable fasteners. The functional benefits of support brackets 902 are substantially similar to those of support brackets 802.

Referring now to FIGS. 11A-11D, bottom pan adapter system 1000 for attaching bottom pan 102 to container 200 is depicted. Bottom pan adapter system 1000 includes bottom pan 102, lip adapter 202, casters 1002, corner brackets 1004, and optionally gasket 204. Casters 1002 are removably coupled to a base surface 1006 of corner brackets 1004. Corner brackets 1004 each comprise a sidewall extending orthogonally from two adjacent sides of base surface 1006. In embodiments, the sidewalls comprise corner apertures 1008 along an end opposite base surface 1006 and are approximately the height of bottom pan 102 such that the corners of pan 102 can rest on base surface 1006. In embodiments, corner apertures 1008 are configured to align and couple with flange apertures 130, bottom adapter lip apertures (not shown) and optionally gasket apertures 214 such as with nuts and bolts or other suitable fasteners.

Referring now to FIGS. 12A-12D, bottom pan adapter system 1100 for attaching bottom pan 102 to container 200 is depicted. Bottom pan adapter system 1100 includes bottom pan 702, lip adapter 202, casters 1002, corner brackets 1004, and optionally gasket 204. Casters 1002 are removably coupled to a base surface 1006 of corner brackets 1004. Corner brackets 1004 each comprise a sidewall extending orthogonally from two adjacent sides of base surface 10006. In embodiments, the sidewalls comprise corner apertures 1008 along an end opposite base surface 1006 and are approximately the height of bottom pan 702. In embodiments, corner apertures 1008 are configured to align and couple with flange apertures (not shown), bottom adapter lip apertures (not shown) and optionally gasket apertures 214 such as with nuts and bolts or other suitable fasteners.

In embodiments, casters 1002 enable bottom pan adapter systems to roll. Ease of movement enables the container to be efficiently stored away from where it is emptied. In embodiments, casters 1002 and corner brackets 1004 can distribute upward forces, such as those experienced when the container is dropped, between container 200 and bottom pan 102. This distribution reduces the risk of damage to bottom pan 102, particularly when bottom pan 102 comprises plastic.

In embodiments, the bottom pan adapter systems of FIGS. 11A-12D that include casters 1002 and corner brackets 1004 can be combined with the support brackets 802, 902 of FIGS. 9A-10D. In combination, these features provide robust protection of bottom pan, which can be made of plastic. Bottom pans made of plastic have the significant advantage of being resistant to corrosion, a main cause of container wear-and-tear. Plastic bottoms of containers have traditionally been infeasible due to the relatively weak strength of plastic when compared to metals; however, embodiments of the present disclosure address this issue by providing ample support for plastic bottom pans.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions. Embodiments described herein may be referred to as a system, assembly, arrangement, or other, and such terms should be considered interchangeable and non-limiting unless otherwise stated.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of repairing a container, the container including a plurality of container sidewalls and an existing bottom portion defining an interior space therein, the method comprising:
   removing the existing bottom portion of the container so as to create an open lower end of the container;
   attaching an adapter to the container, the adapter including a major flange having a container-abutting face, and a minor flange having a pan-abutting face, wherein attaching the adapter to the container comprises positioning the adapter at the open lower end of the container such that the container-abutting face of the adapter is in contact with ends of the container sidewalls, the adapter configured to be attached to the container such that the container-abutting face of the major flange is generally orthogonal to the plurality of container sidewalls; and
   coupling a pan to the adapter, the pan including a plurality of pan sidewalls connected between a bottom pan portion and an attachment flange,
   wherein coupling a pan to the adapter comprises coupling the attachment flange of the pan to the pan-abutting face of the adapter via a plurality of threaded fasteners external to the interior space of the container, the adapter configured such that the pan can be coupled to or uncoupled from the adapter without accessing the interior space of the container.

2. The method of claim 1, wherein attaching the adapter to the container further comprises attaching the adapter such that a perimeter of the minor flange is lesser than a perimeter of the major flange.

3. The method of claim 1, further comprising removing any portion of the major flange which protrudes beyond the sidewalls of the container.

4. The method of claim 1, further comprising coupling a protective cage to the attachment flange of the pan, the protective cage comprising a pair of beams configured to surround at least a portion of the pan.

5. The method of claim 1, wherein the bottom pan portion is generally planar.

6. The method of claim 1, wherein the bottom pan portion includes a plurality of channels configured to receive forks of a forklift.

7. The method of claim 1, wherein a perimeter of the pan sidewalls is smaller than a perimeter of the container sidewalls.

8. The method of claim 1, further comprising coupling at least one caster to the pan to enable rolling of the container coupled to the adapter.

9. The method of claim 1, further comprising coupling a gasket between the pan-abutting face of the adapter and the pan.

10. The method of claim 1, wherein the attachment flange is coupled to the pan-abutting face of the adapter via a plurality of fasteners.

11. A method of constructing a container, the container including a plurality of container sidewalls and an open lower end defining an interior space therein, comprising:
   attaching an adapter to the container, the adapter including a flange having a container-abutting face and a pan-abutting face, wherein attaching the adapter to the container comprises positioning the adapter at the open lower end of the container such that the container-abutting face of the adapter is in contact with ends of the container sidewalls; and
   coupling a pan to the adapter, the pan including a plurality of pan sidewalls connected between a bottom pan portion and an attachment flange,
   wherein coupling a pan to the adapter comprises coupling the attachment flange of the pan to the pan-abutting face of the adapter via a plurality of threaded fasteners external to the interior space of the container, the adapter configured such that the pan can be coupled to or uncoupled from the adapter without accessing the interior space of the container.

12. The method of claim 11, further comprising coupling a protective cage to the attachment flange of the pan, the protective cage comprising a pair of beams configured to surround at least a portion of the pan.

13. The method of claim 11, further comprising coupling at least one caster to the pan to enable rolling of the container coupled to the adapter.

14. The method of claim 11, further comprising coupling a gasket between the pan-abutting face of the adapter and the pan.

15. A method of converting a container to accommodate a replaceable bottom pan, the container including a plurality of container sidewalls and an existing bottom portion defining an interior space therein, comprising:

removing the existing bottom portion of the container so as to create an open lower end of the container;

attaching an adapter to the container, the adapter including a flange having a container-abutting face and a pan-abutting face, wherein attaching the adapter to the container comprises positioning the adapter at the open lower end of the container such that the container-abutting face of the adapter is in contact with ends of the container sidewalls; and coupling the replaceable bottom pan to the adapter, the pan including a plurality of pan sidewalls connected between a bottom pan portion and an attachment flange, wherein coupling the pan to the adapter comprises coupling the attachment flange of the pan to the pan-abutting face of the adapter via a plurality of threaded fasteners external to the interior space of the container, the adapter configured such that the pan can be coupled to or uncoupled from the adapter without accessing the interior space of the container.

16. The method of claim 15, further comprising coupling a protective cage to the attachment flange of the pan, the protective cage comprising a pair of beams configured to surround at least a portion of the pan.

17. The method of claim 15, further comprising:

coupling at least one caster to the pan to enable rolling of the container coupled to the adapter; and coupling a gasket between the pan-abutting face of the adapter and the pan.

* * * * *